United States Patent
Mizuno et al.

(10) Patent No.: US 10,114,667 B2
(45) Date of Patent: Oct. 30, 2018

(54) METHOD OF CONTROLLING COMMUNICATION PATH BETWEEN VIRTUAL MACHINES AND COMPUTER SYSTEM

(71) Applicant: Hitachi, Ltd., Tokyo (JP)

(72) Inventors: Kazuhiko Mizuno, Tokyo (JP); Toshiomi Moriki, Tokyo (JP); Takayuki Imada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 88 days.

(21) Appl. No.: 15/244,144

(22) Filed: Aug. 23, 2016

(65) Prior Publication Data
US 2017/0123835 A1     May 4, 2017

(30) Foreign Application Priority Data
Oct. 28, 2015     (JP) .................................. 2015-212292

(51) Int. Cl.
G06F 9/455     (2018.01)
G06F 9/50     (2006.01)
G06F 9/54     (2006.01)

(52) U.S. Cl.
CPC ........ *G06F 9/45558* (2013.01); *G06F 9/5077* (2013.01); *G06F 9/544* (2013.01);
(Continued)

(58) Field of Classification Search
CPC ................................................ G06F 9/45533
(Continued)

(56) References Cited

U.S. PATENT DOCUMENTS 8,537,860 B2 * 9/2013 Kidambi ............... H04L 45/586
370/392
9,483,290 B1 * 11/2016 Mantri ................ H04L 67/1097
(Continued)

FOREIGN PATENT DOCUMENTS

| JP | 2010-003061 A | 1/2010 |
| JP | 2010-086277 A | 4/2010 |
| JP | 2013-214168 A | 10/2013 |

OTHER PUBLICATIONS

Jian Wang et al., "XenLoop: A Transparent High Performance Inter-VM Network Loopback," [online], [searched on Jun. 23, 2015], the Internet <URL:http://osnet.cs.binghamton.edu/publications/wang08xenloop.pdf>.

*Primary Examiner* — Mehran Kamran
(74) *Attorney, Agent, or Firm* — Mattingly & Malur, PC

(57) ABSTRACT

In a method of controlling a communication path among a plurality of virtual machines operating in one or more physical machines each of which includes one or more CPUs, memories, and I/O devices, allocating a virtual buffer serving as an alias of an actual buffer of a first virtual machine to a communication port that serves as a destination to which a communication path is changed from the first virtual machine and a second virtual machine directly or indirectly communicates with using a communication path change instruction as a trigger. Then, performing memory address translation on a region of the memory referred to by the virtual buffer, and generating the communication path between the first virtual machine and the second virtual machine by associating a region of the memory referred to by the first virtual machine and a region of the memory referred to by the second virtual machine.

4 Claims, 22 Drawing Sheets

(52) U.S. Cl.
CPC .............. *G06F 2009/45579* (2013.01); *G06F 2009/45583* (2013.01); *G06F 2009/45595* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 2004/0215917 | A1* | 10/2004 | Lambeth | G06F 12/0284 711/206 |
| 2005/0278488 | A1* | 12/2005 | Flemming | G06F 9/5077 711/153 |
| 2007/0260715 | A1* | 11/2007 | Alexandrov | H04L 12/1886 709/223 |
| 2008/0263544 | A1* | 10/2008 | Amano | G06F 9/5077 718/1 |
| 2009/0319604 | A1* | 12/2009 | Hatasaki | G06F 3/0607 709/203 |
| 2010/0107162 | A1* | 4/2010 | Edwards | G06F 9/5077 718/1 |
| 2010/0217916 | A1* | 8/2010 | Gao | G06F 12/109 711/6 |
| 2011/0023027 | A1* | 1/2011 | Kegel | G06F 12/10 718/1 |
| 2011/0103389 | A1* | 5/2011 | Kidambi | H04L 45/586 370/395.1 |
| 2013/0042237 | A1* | 2/2013 | Cardona | G06F 12/0284 718/1 |
| 2013/0042240 | A1* | 2/2013 | Cardona | G06F 9/45558 718/1 |
| 2013/0262783 | A1* | 10/2013 | Okada | G06F 9/546 711/147 |
| 2014/0204734 | A1* | 7/2014 | Mizuno | H04L 49/70 370/225 |
| 2015/0095443 | A1* | 4/2015 | Yang | H04L 67/1095 709/212 |
| 2016/0239325 | A1* | 8/2016 | Tsirkin | G06F 9/45558 |
| 2016/0357702 | A1* | 12/2016 | Shamis | G06F 15/167 |
| 2017/0103039 | A1* | 4/2017 | Shamis | G06F 15/17331 |

* cited by examiner

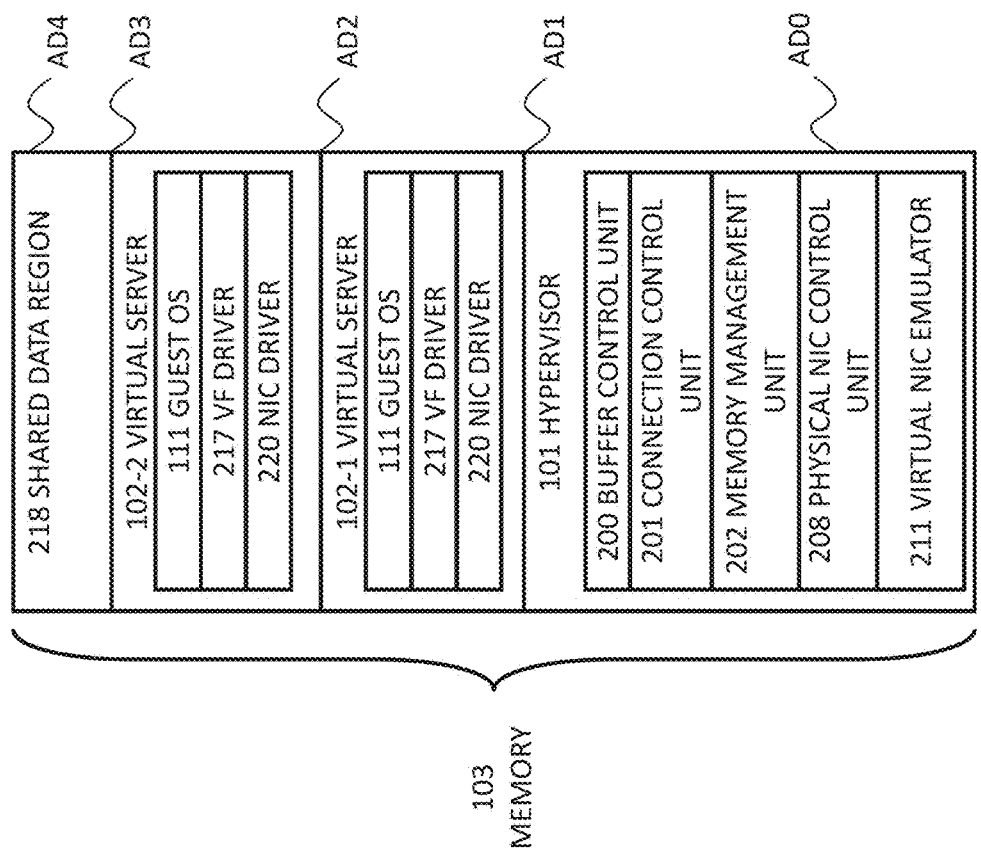

Fig. 4A

| 401 date | 402 Blade# | 403 LPAR# | 404 Host Memory Address | | 407 Guest Memory Address | | 410 VNIC# | 411 Buffer Information | | |
|---|---|---|---|---|---|---|---|---|---|---|
| | | | 405 Low address | 406 High address | 408 Low address | 409 High address | | 412 name | 413 Alias | |
| 2015.01.01 12:00:00 | 1 | 0 | 0x000c | 0x0011 | address | address | | GPA3 | — | |
| | | | 0x0010 | 0x0018 | 0x0015 | 0x0019 | 1 | GPA1 | — | |
| | | 1 | 0x0004 | 0x0008 | address | address | | | | |
| | | | 0x0010 | 0x0018 | 0x000a | 0x000e | 1 | GPA1 | — | |
| | | 2 | 0x0008 | 0x000c | address | address | | | | |
| | | | 0x0010 | 0x0018 | 0x000f | 0x0014 | 1 | GPA2 | GPA1 | |
| | 2 | 0 | 0x000c | 0x0011 | address | address | | | | |
| | | | 0x0010 | 0x0018 | 0x000a | 0x000e | 1 | GPA4 | — | |
| | | 3 | 0x0008 | 0x000c | address | address | | | | |
| | | | 0x0010 | 0x0018 | 0x000f | 0x0014 | 1 | GPA5 | — | |
| ... | ... | ... | ... | ... | ... | ... | ... | ... | ... | |

| 401 date | 402 Blade# | 403 LPAR# | 404 Host Memory Address | | 407 Guest Memory Address | | 410 VNIC# | 411 Buffer Information | |
|---|---|---|---|---|---|---|---|---|---|
| | | | 405 Low address | 406 High address | 408 Low address | 409 High address | | 412 name | 413 Alias |
| 2015.01.01 12:00:00 | 1 | 0 | 0x000c | 0x0011 | address | address | | GPA3 | GPA1 |
| | | | 0x0010 | 0x0018 | 0x0015 | 0x0019 | 1 | GPA1 | — |
| | | 1 | 0x0004 | 0x0008 | address | address | | GPA2 | |
| | | | 0x0010 | 0x0018 | 0x000a | 0x000e | 1 | GPA4 | — |
| | | 2 | 0x0008 | 0x000c | address | address | | GPA4 | — |
| | 2 | 0 | 0x0010 | 0x0018 | 0x000f | 0x0014 | 1 | GPA5 | GPA4 |
| | | 3 | 0x000c | 0x0011 | address | address | | | |
| | | | 0x0010 | 0x0018 | 0x000a | 0x000e | 1 | | |
| | | | 0x0008 | 0x000c | address | address | | | |
| | | | 0x0010 | 0x0018 | 0x000f | 0x0014 | 1 | | |

| 501 date | 502 Source LPAR | | 505 Destination LPAR | | 508 Access Point List |
|---|---|---|---|---|---|
| | 503 LPAR# | 504 Virtual IF# | 506 LPAR# | 507 Virtual IF# | |
| 2015.01.01 12:00:00 | 1 | 1 | — | VF#1 | VIRTUAL SERVER 102-2, VIRTUAL SERVER 102-3 |
| | 2 | 1 | 2 | 1 | VIRTUAL SERVER 102-1, VIRTUAL SERVER 102-3 |
| | 3 | 1 | 1 | VF#2 | VIRTUAL SERVER 102-1, VIRTUAL SERVER 102-2 |
| | .. | .. | — | — | .. |

Fig. 5B

| 501 date | 502 Source LPAR | | 505 Destination LPAR | | 508 Access Point List |
|---|---|---|---|---|---|
| | 503 LPAR# | 504 Virtual IF# | 506 LPAR# | 507 Virtual IF# | |
| 2015.01.01 12:00:00 | 1 | 1 | — | VF#1 | VIRTUAL SERVER102-2 VIRTUAL SERVER102-3 |
| | 1 | 2 | 3 | 1 | |
| | 2 | 1 | — | — | VIRTUAL SERVER102-1 VIRTUAL SERVER102-3 |
| | 2 | | — | — | |
| | 3 | 1 | 1 | 2 | VIRTUAL SERVER102-1 VIRTUAL SERVER102-2 |
| | | 2 | — | VF#3 | |
| | ... | ... | ... | ... | ... |

↙ 204

METHOD OF CONTROLLING COMMUNICATION PATH BETWEEN VIRTUAL MACHINES AND COMPUTER SYSTEM

CLAIM OF PRIORITY

The present application claims priority from Japanese patent application serial no. JP2015-212292, filed on Oct. 28, 2015, the content of which is hereby incorporated by reference into this application.

TECHNICAL FIELD

The present invention relates to a technique of controlling a communication path of a virtual server system, and more particularly, to a technique of controlling a communication path when mutual communication is performed between virtual servers.

BACKGROUND ART

In recent years, many companies are seeking migration of various businesses to the cloud, and a market of a new IT era is led by this and continuously growing. It is because efficient IT investment including the maintenance, load reduction, and the like are expected in addition to system construction in a short period of time. Under such circumstances, VMware, Inc. advocates a concept software defined data center (SDDC) in which a data center is virtualized by extending a concept of software defined networking (SDN) in which network control is performed through software to a data center and is attracting attention. The purpose is to abstract an IT infrastructure through software as much as possible, provide a virtualized flexible service, and promote automation of introduction and expansion of an IT infrastructure and automation of service level control.

In the SDDC, flexibility is improved by separating software (on a virtual server) and hardware that actually performs a process. For this reason, in a virtual environment, it is required that software can be seamlessly executed regardless of an operation position of a virtual server. Particularly, in recent years, many hypervisor products capable of dealing with live migration of a virtual server being operated have been introduced. In this regard, it is desirable that communication can be seamlessly performed while causing the application layer on the virtual server not to be aware of it even when a communication path between the virtual servers is changed, for example, due to the live migration of the virtual server.

Meanwhile, high-speed broad band communication of 10 Gbps or higher is required as communication performance. For this reason, in the virtual environment, a (zero-copy) remote direct memory access (RDMA) of communicating data directly to a memory to suppress communication performance degradation caused by overhead resulting from virtualization, a high-speed I/O device such as single root I/O virtualization (SR-IOV), or the like is used to improve communication performance. Further, a stack type configuration, a mesh type configuration (peer to peer (P2P) communication), or the like is used as a network configuration between virtual servers, but P2P communication in which mutual communication is performed between virtual servers, and useless communication is small is being used.

As a background art of a technical field in which such communication control between virtual servers is performed, a technique of continuing communication by allocating a port in which two logical objects are allocated to a main memory to a virtual server and switching a port to a line failure (Patent Document 1) has been proposed. Specifically, a communication path using the RDMA is made redundant, and a plurality of ports are allocated to a virtual server according to redundancy. As a result, when a line failure occurs, a communication path can be changed by stopping the use of a port connected to a line having a failure and using a port connected to a redundant line instead.

XenLoop (Non Patent Document 1) has been proposed as a communication scheme between virtual servers (Chapter 3 "DESIGN AND IMPLEMENTATION"). XenLoop is a driver that is implemented between the IP layer and the data link layer of the communication protocol stack. Thus, XenLoop receives data transmitted from an application in a packet form. For example, when a virtual server of a transmission destination exists on the same hypervisor, transmission is performed using a communication channel (a Xenloop channel) of the hypervisor, and a packet is transferred to the data link layer without change otherwise.

CITATION LIST

Patent Document

Patent Document 1: JP 2010-86227 A

Non-Patent Document

Non Patent Document 1: Jian Wang, Kwame-Lante Wright, and Kartik Gopalan, "XenLoop: A Transparent High Performance Inter-VM Network Loopback," [online], [searched on Jun. 23, 2015], the Internet <URL:http://osnet.cs.binghamton.edu/publications/wang08xenloop.pdf>

SUMMARY OF THE INVENTION

Problems to be Solved by the Invention

In the technique of changing a communication path by allocating a plurality of communication ports to the virtual server and switching the communication ports as in Patent Document 1, high-speed communication such as the RDMA can be used, and even when the communication path between the virtual servers is switched, the software on the virtual server can perform communication seamlessly. However, in this technique, since it is necessary to allocate the port to the virtual server for each communication path, when a configuration of the virtual server is changed, it is necessary to perform control of allocating the communication port corresponding to the communication path to the virtual server and management of the allocated communication port each time, and thus there is a problem in that it is not easy to perform the configuration management of the virtual server.

In the technique of changing the communication path according to a mounting position of the virtual server serving as the transmission destination as in Non Patent Document 1, even when the virtual server is migrated to another physical machine, the software on the virtual server can perform communication seamlessly. However, in the communication process, since it is necessary to change a kernel module of Xen (a registered trademark) serving as a hypervisor of a virtual environment (to perform a header file change, a compilation process, and like), there is a problem in that it is hard to easily change the communication path between the virtual servers.

It is an object of the present invention to solve the above problems and provide a technique capable of maintaining the communication performance between the virtual servers, easily performing the configuration management of the virtual server, and easily switching the communication path between the virtual servers.

Solutions to Problems

The present disclosure includes a device that solves the above problems, but an example thereof is as follows.

Provided is a method of controlling a communication path among a plurality of virtual machines operating in one or more physical machines each of which includes one or more CPUs, one or more memories, and one or more I/O devices. The method includes allocating a virtual buffer serving as an alias of an actual buffer of a first virtual machine to a communication port that serves as a destination to which a communication path is changed from the first virtual machine and a second virtual machine directly or indirectly communicates with using a communication path change instruction as a trigger, performing memory address translation on a region of the memory referred to by the virtual buffer, and generating the communication path between the first virtual machine and the second virtual machine by associating a region of the memory referred to by the first virtual machine and a region of the memory referred to by the second virtual machine.

In a specific exemplary configuration of the present invention, the physical machine has a hypervisor that controls the virtual machine, and the hypervisor includes a buffer control unit that controls the actual buffer and the virtual buffer that are allocated to the virtual machine and the I/O device. The hypervisor includes a connection control unit that controls a communication process on the I/O device mounted in the physical machine. The hypervisor includes a memory management unit that holds an inter-LPAR communication table in which the communication path between the virtual machines is recorded, and communication port information is included and an operation position information table in which position information of the virtual machine is recorded, and memory address information is included. When the communication path change instruction is an instruction to change to a communication path in which communication is performed between the first virtual machine operating in the first physical machine and the second virtual machine operating in the first physical machine, based on the memory address information of the first virtual machine and the second virtual machine and the communication port information of the first virtual machine and the second virtual machine, an allocation of the virtual buffer to a communication port of the second virtual machine and address translation are performed, and a shared memory is used for the communication path between the first virtual machine and the second virtual machine.

In another specific example of the present invention, the communication path change instruction is assumed to be an instruction to change to a communication path in which communication is performed between the first virtual machine operating in the first physical machine and a third virtual machine operating in a second physical machine other than the first physical machine. In this example, based on the memory address information of the first virtual machine and the first physical machine and the communication port information of the first virtual machine and the first physical machine, an allocation of the virtual buffer to the communication port of the first physical machine and address change are performed, and a communication path in which the region of the memory used by the first virtual machine is communicated to the third virtual machine of the second physical machine is generated.

In a specific example of the present invention, the communication path change instruction may be executed by an instruction given from a management server. The management server includes a setting screen used for changing the communication path between the virtual machines, and the setting screen displays a result of changing the communication path between the virtual machines as the virtual machines serving as a transmission source and a transmission destination and a communication means between the virtual machines are selected.

According to another aspect of the present invention, there is provided a computer system including one or more virtual machines operating on one or more physical machines each of which includes one or more CPUs, one or more memories, and one or more I/O devices. In this system, the physical machine has a hypervisor that controls the virtual machine, and the hypervisor includes a buffer control unit that controls an actual buffer and a virtual buffer allocated to the virtual machine and the I/O device. When communication between a transmission side virtual machine and a reception side virtual machine is switched to communication between the transmission side virtual machine and another virtual machine, the buffer control unit switches an allocation of the virtual buffer serving as an alias of the actual buffer allocated to a communication port used by the transmission side virtual machine from a communication port with which the reception side virtual machine is able to perform communication to a communication port with which the other virtual machine is able to perform communication, and establishes a communication path between the transmission side virtual machine and the other virtual machine by associating a region of the memory referred to by the transmission side virtual machine and a region of the memory referred to by the other virtual machine.

In a specific exemplary configuration of the present invention, the hypervisor includes a connection control unit that controls a communication process on the I/O device mounted in the physical machine and a memory management unit that holds an inter-LPAR communication table in which the communication path between the virtual machines is recorded, and communication port information is included and an operation position information table in which position information of the virtual machine is recorded, and memory address information is included. In this system example, when the communication path is changed to a communication path in which communication is performed between the transmission side virtual machine operating in a first physical machine and the other virtual machine operating in the first physical machine by a communication path change instruction of a management server, the buffer control unit acquires memory address information of the transmission side virtual machine and the other virtual machine from the operation position information table of the memory management unit and acquires communication port information of the transmission side virtual machine and the other virtual machine from the inter-LPAR communication table, performs an allocation of the virtual buffer to a communication port of the other virtual machines and address changes based on a descriptor, and uses a shared memory for the communication path between the transmission side virtual machine and the other virtual machine.

In another specific exemplary configuration of the present invention, the hypervisor includes a connection control unit that controls a communication process on the I/O device mounted in the physical machine and a memory management unit that holds an inter-LPAR communication table in which the communication path between the virtual machines is recorded, and communication port information is included and an operation position information table in which position information of the virtual machine is recorded, and memory address information is included. In this system, when the communication path is changed to a communication path in which communication is performed between the transmission side virtual machine operating in a first physical machine and the other virtual machine operating in a second physical machine other than the first physical machine by a communication path change instruction of a management server, the buffer control unit acquires memory address information of the transmission side virtual machine and the connection control unit from the operation position information table of the memory management unit and acquires communication port information of the transmission side virtual machine and the connection control unit from the inter-LPAR communication table, performs an allocation of the virtual buffer to a communication port of the connection control unit and address changes based on a descriptor, and generates a communication path in which a region of the memory used by the transmission side virtual machine is communicated to the other virtual machine of the second physical machine through the connection control unit.

Effects of the Invention

According to the present invention, it is possible to maintain the communication performance between the virtual servers, easily perform the configuration management of the virtual server, and easily switch the communication path between the virtual servers.

BRIEF DESCRIPTION OF THE DRAWINGS

FIG. 3 is a conceptual diagram illustrating exemplary memory content according to the first embodiment;

FIG. 4A is a diagram illustrating an exemplary operation position information table according to the first embodiment;

FIG. 4B is a diagram illustrating an exemplary operation position information table according to the first embodiment;

FIG. 5A is a diagram illustrating an exemplary inter-LPAR communication table according to the first embodiment;

FIG. 5B is a diagram illustrating an exemplary inter-LPAR communication table according to the first embodiment;

MODE FOR CARRYING OUT THE INVENTION

Figure 1:
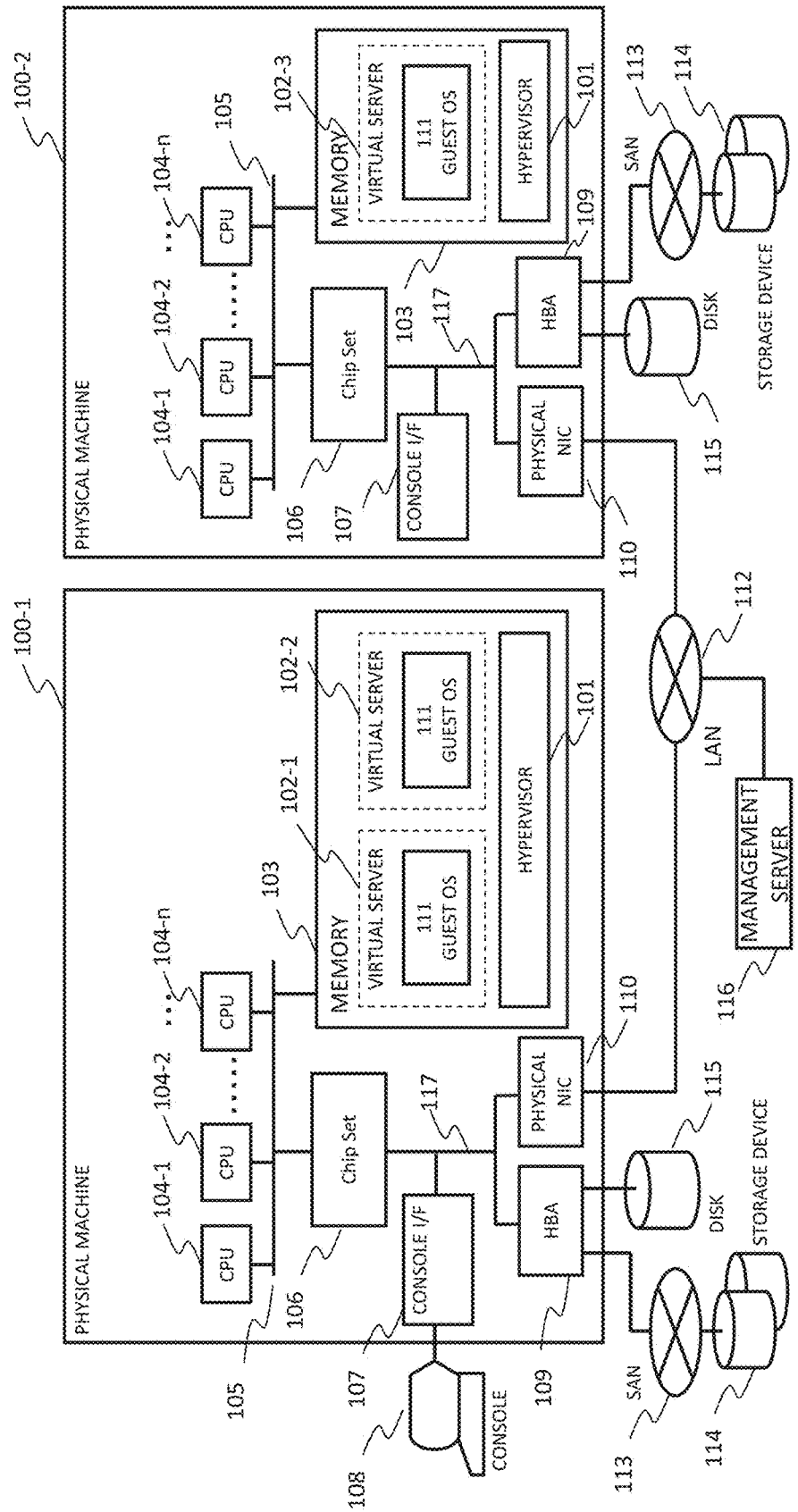
FIG. 1 is a block diagram illustrating an exemplary configuration of a physical machine according to a first embodiment.

Hereinafter, exemplary embodiments will be described with reference to the appended drawings. However, the present invention is not interpreted to be limited to a description of the following embodiments. It would be understood by those having skill in the art that a specific configuration of the present invention can be changed within the scope not departing from the spirit or gist of the present invention.

In a configuration of the invention to be described below, the same parts or parts having the same functions are denoted by the same reference numerals in different drawings, and a duplicated description may be omitted.

In the present disclosure, notation such as "first," "second," and "third" is added to identify constituent elements and not intended to limit a number or an order necessarily. Numbers identifying constituent elements are used for each context, and a number used in one context does not necessarily indicate the same element in another context. A constituent element identified by a certain number is not prevented from doubling a function of a constituent element identified by another number.

For example, a position, a size, a shape, or a range of each of elements illustrated in the drawings may not be an actual position, an actual size, an actual shape, or an actual range thereof in order to facilitate understanding of the invention. Thus, the present invention is not necessarily limited to, for example, a position, a size, a shape, or a range illustrated in the drawings.

First Embodiment

The present embodiment will be described with an example of a physical machine 100 that performs a process of switching a communication path between virtual servers 102 operating on the physical machines 100, respectively.

FIG. 1 is an exemplary configuration diagram of the physical machine 100 on which a plurality of virtual servers 102 operate. The physical machine 100 includes one or more CPUs 104, and the CPU 104 is connected to a chip set 106 via an interconnect 105 such as QuickPath Interconnect (QPI) or Scalable Memory Interconnect (SMI).

A physical Network Interface Card (NIC) 110 serving as an I/O device connected to a local area network (LAN) 112, a Host Bus Adapter (HBA) 109 connected to a disk 115 or a storage device 114, and a console interface (console I/F) 107 connected to a console 108 are connected to the chip set 106 via a bus 117 such as PCI Express.

The CPU 104 accesses a memory 103 via the interconnect 105, accesses the physical NIC 110 through the chip set 106, and performs a predetermined process. A hypervisor 101 is loaded onto the memory 103, and a-guest OS 111 is operated through the virtual server 102 controlled by the hypervisor 101.

Figure 2:
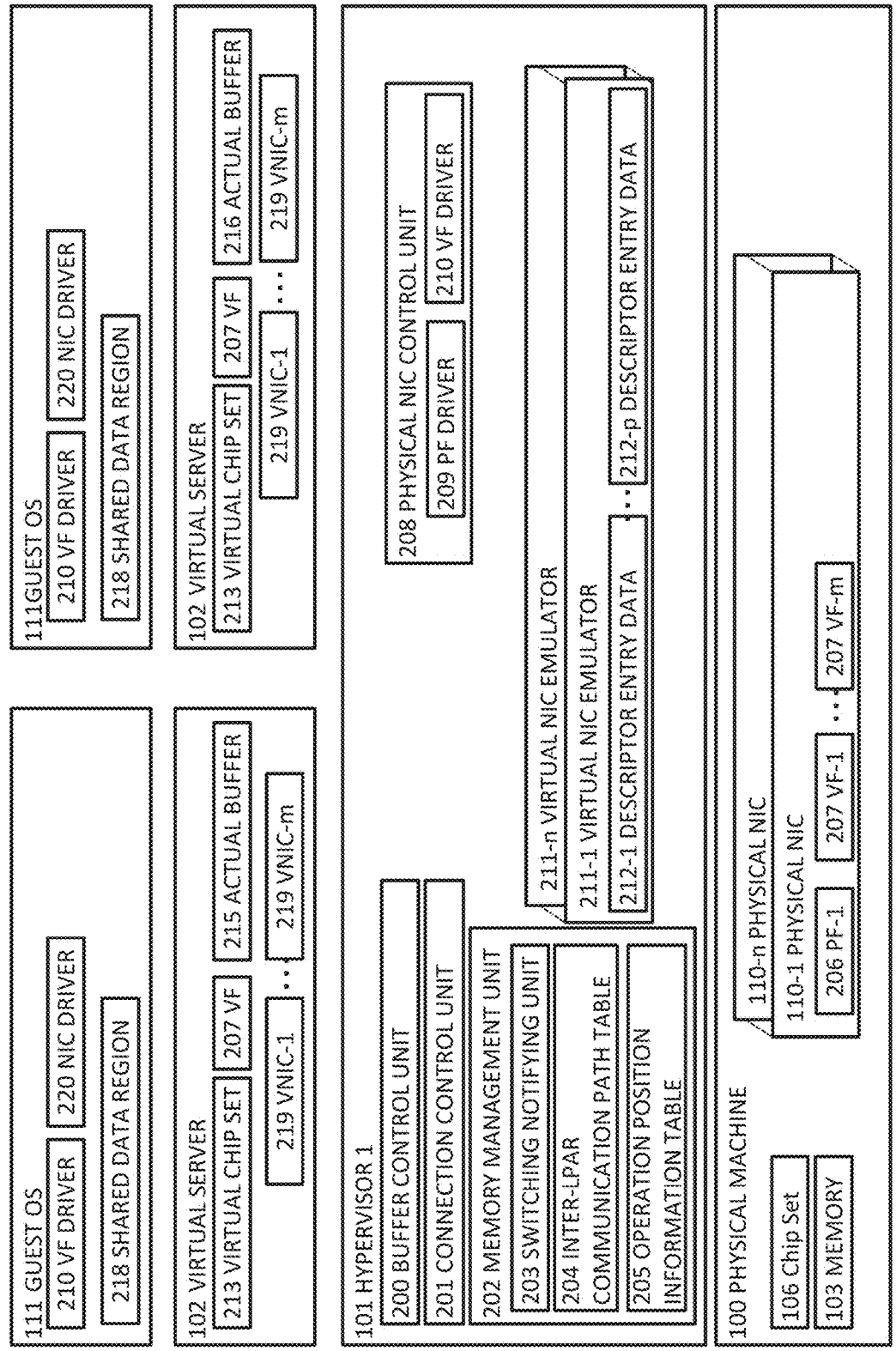
FIG. 2 is a stack diagram illustrating an exemplary relation between a physical machine and software according to the first embodiment.

Next, a main part of a software configuration for implementing the virtual server 102 on the physical machine 100 and hardware elements serving as a control target will be described with reference to FIG. 2. The hypervisor 101 that controls one or more virtual server 102 operates on the physical machine 100.

Each of one or more physical NICs 110 has an I/O virtualization (IOV) function and includes a physical function (PF) 206 and a virtual function (VF) 207. The PF 206 is a function that is commonly usable, but the VF 207 is a function that can be used only when the IOV function is enabled. The virtual server 102 may include a physical NIC 110 that does not support the IOV.

The PF 206 has a function of performing transmission and reception of data with a network outside the physical machine 100, and includes an IOV register that controls the IOV function. The VF 207 has a function of performing transmission and reception of data with a network outside the physical machine 100 only when the IOV function is enabled.

The hypervisor 101 generates the virtual server 102, and provides a function (a virtual chip set 213) corresponding to the chip set 106 for the virtual server 102. The hypervisor 101 allocates an arbitrary VF 207 to an arbitrary virtual server 102 in an occupancy manner, and has a function (pass-through function) of permitting the guest OS 111 operating on the virtual server 102 to directly manipulate the VF 207.

An actual buffer 215 or a virtual buffer 216 is allocated to the virtual server 102. The hypervisor 101 includes a buffer control unit 200 that controls a memory address used for accessing the actual buffer 215 or the virtual buffer 216.

The hypervisor 101 further includes a connection control unit 201 that performs communication control when the physical machine 100 performs communication with another physical machine 100, a switching notifying unit 203 that communicates information with a management server 116 or another physical machine 100, an operation position information table 205 in which an operation position and configuration information of the virtual server 102 are registered, and an inter-LPAR communication path table 204 in which information of a communication path between the virtual servers 102 (LPARs). The hypervisor 101 further includes a memory management unit 202 that manages the switching notifying unit 203, the operation position information table 205, and the inter-LPAR communication path table 204.

The hypervisor 101 further includes a physical NIC control unit 208 that manages a PF driver 209 and a VF driver 210 that are allocated to the virtual server 102.

A virtual NIC emulator 211 of the hypervisor 101 includes descriptor entry data 212 that provides address information of the actual buffer 215 or the virtual buffer 216 allocated to the virtual server 102. The descriptor entry data 212 holds, for example, address information of a memory region used by the actual buffer 215 or the virtual buffer 216.

Virtual NICs (VNICs) 219 is allocated to each of the virtual servers 102. The virtual NICs 219 are connected so that a plurality of virtual servers 102 share the physical NIC 110 through a virtual switch (not illustrated) or the like.

The PF driver 209 has a function of manipulating the IOV register included in the PF 206.

The virtual server 102 includes a virtual part such as the virtual chip set 213 provided by the hypervisor 101 and the VF 207 that is allocated in the occupancy manner. The guest OS 111 operates on the virtual server 102. The guest OS 111 performs communication through the VF 207 using the VF driver 210 corresponding to a type of VF 207, and performs communication using the VNIC 219 or direct communication with the physical NIC 110 using an NIC driver 220. The guest OS 111 can be provided with a data region (a shared data region 218) that is shared and used by the guest OSs 111 on the respective virtual server 102 by changing the memory address of the actual buffer 215 or the virtual buffer 216, and perform shared memory communication using the shared data region 218.

The buffer control unit 200 switches the communication path of the virtual server 102 by controlling the actual buffer 215 and the virtual buffer 216 for the change of the communication path of the virtual server 102 based on the position information and the configuration information of the virtual server 102 registered in the inter-LPAR communication path table 204 and the operation position information table 205. Further, when communication with another physical machine 100 is performed through the communication path of the virtual server 102, the connection control unit 201 is used. This process will be described later in detail.

FIG. 3 illustrates an example of the memory 103 managed by the hypervisor 101. The hypervisor 101 allocates a region used by the hypervisor 101 and a region used by the virtual server 102 on the memory 103.

For example, when a physical address (a host memory address) is allocated as illustrated in FIG. 3, the hypervisor 101 allocates addresses AD0 and AD1 to the region of the hypervisor 101, allocates addresses AD1 and AD2 to the virtual server 102-1, allocates addresses AD3 and AD4 to the virtual server 102-2, and allocates addresses AD3 and AD4 to the shared data region 218 used when the virtual server 102-1 and the virtual server 102-2 perform communication using the shared memory.

The guest OS 111, the VF driver 210, and the NIC driver 220 are stored in the region used by each of the virtual servers 102. The buffer control unit 200, the connection control unit 201, the memory management unit 202, the physical NIC control unit 208, and the virtual NIC emulator 211 are stored in the region used by the hypervisor 101.

FIG. 4A illustrates an exemplary configuration of the operation position information table 205. The operation position information table 205 is a table that holds the operation position and the use memory address information of the virtual server 102. In this table, the operation position of the virtual server 102 is registered based on a serial number (Blade#) 402 of the physical machine 100 and a serial number (LPAR#) 403 of the virtual server 102 at an acquisition date and time (date) 401 of information.

In the example of FIG. 4A, the virtual server 102 is assumed to have three LPARs#1 to #3. Information of the hypervisor 101 is registered in the LPAR#0. As the memory region used by each of the virtual servers 102, a host memory address 404 and a guest memory address 407 are registered, and a virtual NIC (VNIC#) 410 that allocates a buffer using each address is registered.

A name 412 of the buffer and information (Alias) 413 of the actual buffer 215 when the virtual buffer 216 serving as an alias of the actual buffer 215 is generated are registered in buffer information 411 of the buffer to be allocated. Here, the name of the buffer is specified using a number of a guest physical address (GPA). In the example of FIG. 4A, GPA1 of the actual buffer 215 of the LPAR#1 and GPA2 of the virtual buffer 216 of the LPAR#2 refer to the same memory address.

The host memory address is the physical address of the memory 103 mounted in the physical server as described above, and the guest memory address is the physical address of the logical memory 103 that is allocated to the guest OS 111. In FIG. 4A, the memory address has two upper and lower portions in each of the LPARs#1 to #3 (serving as the virtual server). The upper address of the host memory address 404 indicates a region used by each guest OS 111, and for a corresponding guest memory address 407, only "address" is displayed, and specific content is omitted. The lower address of the host memory address 404 indicates a shared data region 218 (FIG. 3), the same address is allocated as the lower address, and each guest OS 111 has a corresponding guest memory address 407. In the example of FIG. 4A, the LPAR#1 and the LPAR#2 have the same guest memory address value but may have different guest memory address values according to a type of a guest OS or an application that operates practically.

According to the operation position information table 205, it is possible to determine whether communication between the virtual servers 102 operating on the same physical machine 100 or communication between the virtual servers 102 operating on the different physical machines 100 is performed according to the operation position of the virtual server 102 serving as a target in a communication path change instruction.

FIG. 5A illustrates an exemplary configuration of the inter-LPAR communication path table 204. The inter-LPAR communication path table 204 is a table that holds connection information of a transmission source and a transmission destination of the virtual server 102. In this table, in the inter-LPAR communication path table 204, a serial number (LPAR#) 503 of the virtual server 102 and a serial number (Virtual IF#) 504 of the virtual NIC 219 used by the virtual server 102 are registered as information (source LPAR) 502 of the virtual server 102 of the transmission source at an acquisition date and time (date) 501 of the information. A serial number (LPAR#) 506 of the virtual server 102 and a serial number (Virtual IF#) 507 of the virtual NIC 219 used by the virtual server 102 are registered as information (Destination LPAR) 505 of the virtual server 102 of the transmission destination.

In the virtual NIC serial number 507, for the virtual NIC 219 allocated to the virtual server 102, a serial number is registered, but when the physical NIC 110 is directly used, registration is performed such that a device name to be used such as "VF#1" is given. Based on this information, a communication configuration between the virtual servers 102 is understood. Further, information (Access Point List) 508 of the virtual server 102 in which the transmission source of each of the virtual servers 102 is scheduled as a candidate of the transmission destination is registered.

Figure 6:
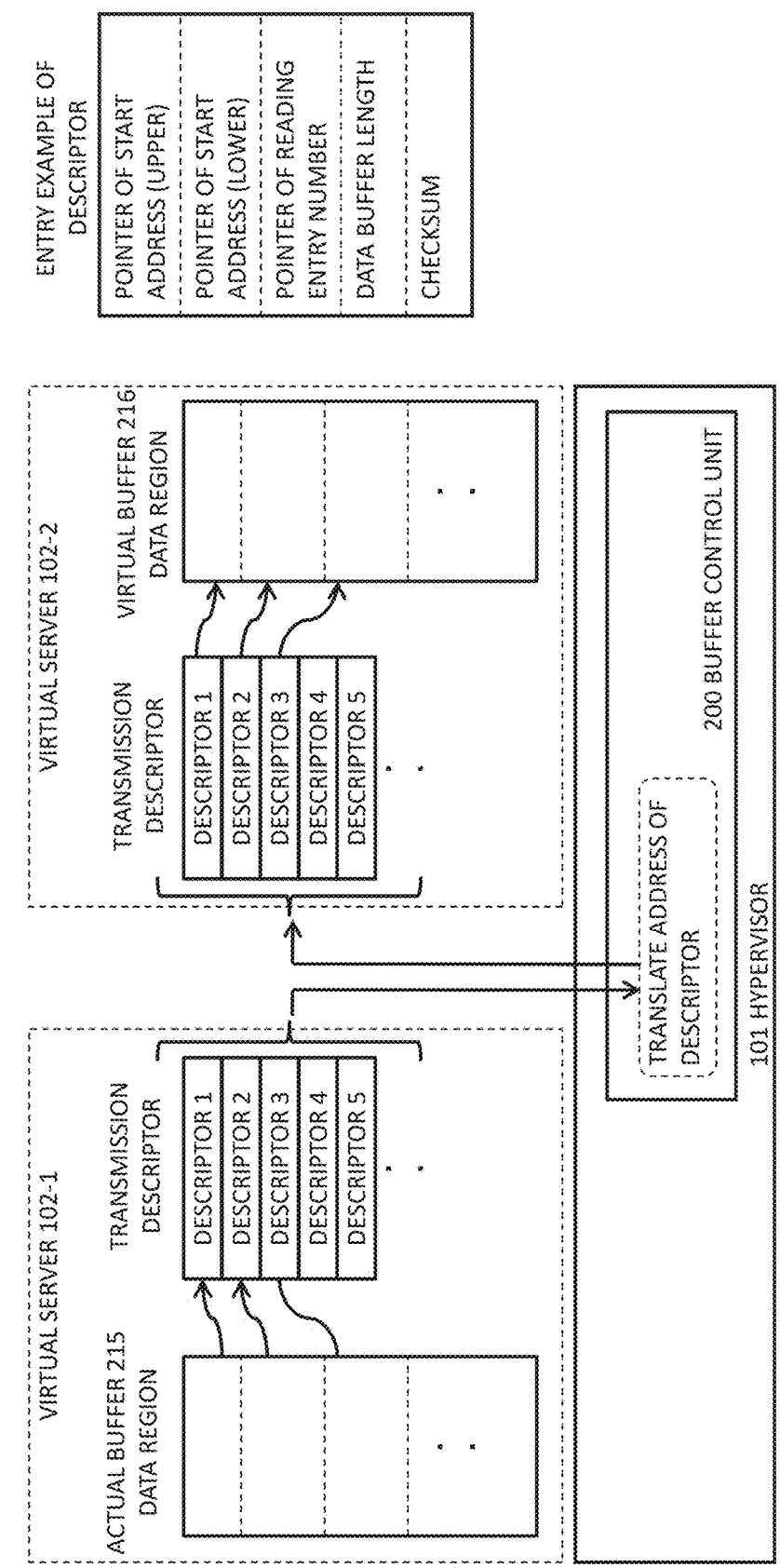
FIG. 6 is a conceptual diagram illustrating an exemplary relation between a descriptor and a buffer according to the first embodiment.

FIG. 6 illustrates an example of a method of controlling the actual buffer 215 and the virtual buffer 216 according to the present embodiment. FIG. 6 illustrates an example in which data is transmitted from the virtual server 102-1 to the virtual server 102-2. The actual buffer 215 is allocated to the virtual server 102-1, and the virtual buffer 216 serving as the alias of the actual buffer 215 is allocated to the virtual server 102-2. The alias refers to a concept in which the actual buffer 215 and the virtual buffer 216 use the same memory space.

The above example is described with reference back to FIG. 4A. The virtual server 102-1 (LPER#1) and the virtualserver 102-2 (LPER#2) use the same host memory address 404, that is, 0x0010 to 0x0018, and the alias of the buffer GPA1 of the virtual server 102-1 is allocated to the virtual server 102-2. At this time, the guest memory addresses 407 of the virtual servers 102-1 and 102-2 are different, but the same address can be referred to through address translation of FIG. 6.

For the memory regions used by the actual buffer 215 and the virtual buffer 216, a descriptor has a pointer of address information of a use memory, and control is performed using the descriptor. In the present embodiment, descriptor information at the time of transmission of the virtual server 102-1 and descriptor information at the time of reception of the virtual server 102-2 undergoes descriptor address translation performed by the buffer control unit 200. As a result, the transmission descriptor and the reception descriptor can use the same memory region, and data stored in the actual buffer 215 can be accessed from the virtual server 102-2. In other words, the virtual server 102-1 and the virtual server 102-2 can perform communication using the shared memory. In FIG. 4A, the guest memory addresses 407 of the virtual servers 102-1 and 102-2 are different, but it will be appreciated that when the same guest memory address is set, the address translation based on the operation position information table 205 is unnecessary.

Figure 7:
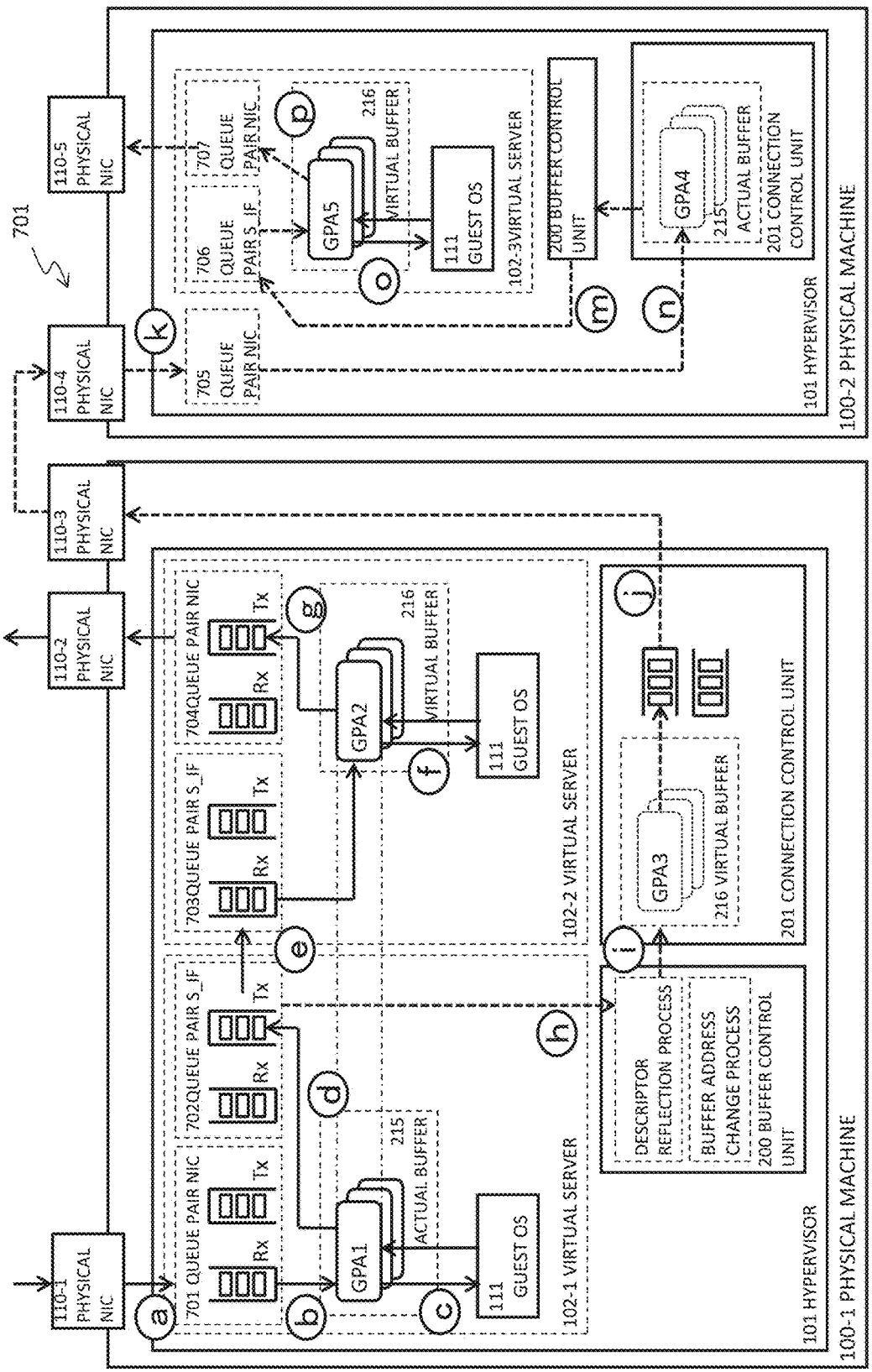
FIG. 7 is a schematic diagram illustrating an exemplary process of the physical machine according to the first embodiment.

FIG. 7 illustrates an example of an overall process including a method of controlling the actual buffer 215 and the virtual buffer 216. FIG. 7 illustrates an example in which the virtual server 102-1 and the virtual server 102-2 operate on the physical machine 100-1, the virtual server 102-3 operates on the physical machine 100-2, and communication between the virtual server 102-1 and the virtual server 102-2 (solid-line arrows in FIG. 7) is switched to communication between the virtual server 102-1 and the virtual server 102-3 (dotted line arrows in FIG. 7).

First, a communication process between the virtual server 102-1 and the virtual server 102-2, data received from the outside is stored in a queue Rx of a queue pair NIC 701 of the physical NIC 110-1 (a process (a)) and acquired in the actual buffer 215 (GPA1) (a process (b)). The acquired data undergoes processing of an application operating on the guest OS 111 and is stored in the actual buffer 215 (a process (c)).

The address information (the guest memory address 407) of the memory region serving as a storage destination of the actual buffer 215 is stored in a queue Tx of a queue pair S_IF (a shared interface) 702 of the virtual device of the virtual server 102-1 (a process (d)) and then transferred to a queue Rx of a queue pair S_IF 703 of the virtual device of the virtual server 102-2 (a process (e)). Here, the virtual device corresponds to the VNIC 219 of FIG. 2. In the virtual server 102-2, the address translation illustrated in FIG. 6 is performed based on the queue Rx of the queue pair S_IF 703 of the virtual device as necessary, and acquires information of the memory region is acquired in the virtual buffer 216 (GPA2). Then, the data undergoes application processing of the guest OS 111 and then stored in the virtual buffer 216 again (a process (f)). The data stored in the virtual buffer 216 is transmitted to the outside through a queue Tx of a queue pair NIC 704 of the physical NIC 110-2 (a process (g)).

Next, a process of switching the communication between the virtual server 102-1 and the virtual server 102-2 to the communication between the virtual server 102-1 and the virtual server 102-3 will be described. The processes (a) to (d) is the same as the communication process between the virtual server 102-1 and the virtual server 102-2, and thus a description thereof is omitted.

Queue information data processed by the virtual server 102-1 is acquired by the buffer control unit 200 (a process (h)). Then, the queue information is transmitted to the virtual buffer 216 (GPA3) created in the connection control unit 201 that communicates with the physical NIC 110-3 (a process (i)). The queue information is transmitted from the physical NIC 110-3 of the physical machine 100-1 to the physical machine 100-2 (a process (j)).

In the physical machine 100-2, the alias of the actual buffer 215 (GPA4) is allocated to the virtual buffer 216 (GPA5). The queue information received from the physical machine 100-1 is stored in a queue of a queue pair NIC 705 (a process (k)), and a data region to store is acquired in the actual buffer 215 (GPA4) based on the queue information (a process (n)). In other words, a copy of content of the virtual buffer (GPA3) is stored in the actual buffer 215 (GPA4). The data stored in the actual buffer 215 (GPA4) undergoes the address translation performed by a buffer address change process function of the buffer control unit 200 (a process (m)), the virtual buffer 216 (GPA5) acquires data from information stored in a queue of a queue pair S_IF 706 of the virtual server 102-3, and the application processing of the guest OS 111 is performed (a process (o)). A result of the present process is stored in the virtual buffer 216 (GPA5) and then transmitted to the outside through the physical NIC 110-5.

The processes (k) to (p) is performed by the physical machine 100-2, and the present process need not be performed when the physical machine 100-2 does not particularly perform special control.

Through the above process, the virtual server 102-1 and the virtual server 102-2 can perform the data communication using the shared memory, and even when the communication path is switched to a different physical machine 100, it is unnecessary to allocate a port to the virtual server 102 separately, and it is possible to seamlessly switch the communication path while causing the guest OS 111 not to be aware of it. Here, a communication state between the virtual server 102 on the same physical machine 100 is referred to as "communication between virtual servers in the same physical machine," and a communication state between the virtual server 102 on the different physical machines 100 is referred to as communication between virtual servers on different physical machines."

Next, a process of performing switching from the communication between the virtual servers in the same physical machine to the communication between the virtual servers on the different physical machines and a process of performing switching from the communication between the virtual servers on the different physical machines to the communication between the virtual servers in the same physical machine will be described with reference to FIGS. 8 and 9.

Figure 8:
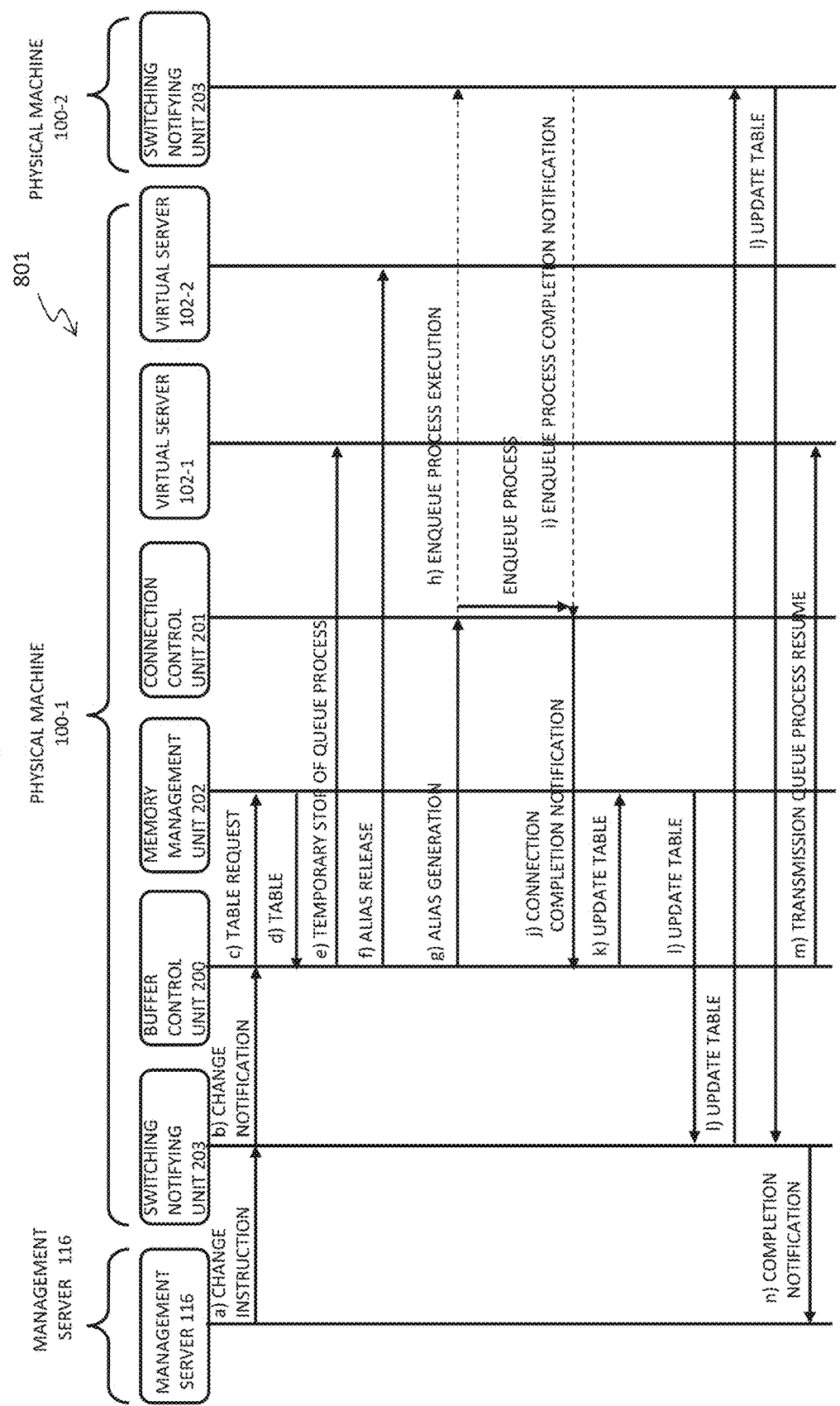
FIG. 8 is an exemplary timing chart in which communication within the same physical machine is switched to communication between different physical machines according to the first embodiment.

FIG. 8 illustrates an example of a timing chart when switching from the communication between the virtual servers in the same physical machine to the communication between the virtual servers on the different physical machines is performed.

First, a path change instruction is transmitted from the management server 116 to the physical machine 100-1 serving as a communication path switching target (a). The path change instruction is received by the switching notifying unit 203, and a path change notification is transmitted to the buffer control unit 200 (b). The buffer control unit 200 transmits a table acquisition request for table information (the operation position information table 205 and the inter-LPAR communication path table 204) held in the memory management unit 202 to the memory management unit 202 (c). The buffer control unit 200 acquires a table content notification (d), and temporarily stops a process of the transmission queue of the virtual server 102-1 serving as a communication path change target (e). At this time, since the process of the virtual server 102-1 is not stopped, the processing result of the virtual server 102-1 is stored in the actual buffer 215.

The buffer control unit 200 releases the virtual buffer 216 (the alias of the actual buffer 215 of the virtual server 102-1) allocates to the virtual server 102-2 serving as a communication destination of the virtual server 102-1 based on information of the acquired table (f). Then, the virtual buffer 216 (the alias of the actual buffer 215 of the virtual server 102-1) is newly allocated to the connection control unit 201 (g).

After the virtual buffer 216 is allocated to the connection control unit 201, data is transmitted to the physical machine 100-2, and after all data is transmitted, a notification indicating that a connection is established between the physical machine 100-1 and the physical machine 100-2 is given to the buffer control unit 200. In other words, an enqueue process of writing the data to the virtual server 102-3 of the physical machine 100-2 is performed (h), an enqueue process completion notification is received from the physical machine 100-2 (i), and a connection completion notification is given to the buffer control unit 200 (j).

The buffer control unit 200 that has received the connection completion notification updates the respective tables (the operation position information table 205 and the inter-LPAR communication path table 204), and transmits the updated tables to the memory management unit 202 (k). A correspondence relation with the actual buffer 215 of the virtual server 102-1 and a new virtual buffer 216 that is allocated to the connection control unit 201 is recorded in the operation position information table 205. The transmission of data to physical machine 100-2 is recorded in the inter-LPAR communication path table 204. The memory management unit 202 transmits the acquired updates tables to the relevant physical machines 100 through the switching notifying unit 203 (l).

When the communication path between the virtual servers 102 is changed as described above, change information is transmitted to the respective physical machines 100, the change information is received by the physical machines 100, and thus the update information can be shared between the physical machines 100.

After the series of processes described above are completed, the process of the transmission queue of the virtual server 102-1 resumes (m), and a communication path change completion notification is transmitted to the management server 116 (n). In the present process, the process is performed based on the path change instruction given from the management server 116, but the communication path may be automatically switched in the hypervisor 101, for example, according to use situations of resources such as the CPU 104 or the memory 103 in addition to the trigger given from the management server 116.

FIGS. 4A and 5A illustrate content of a table when the communication between the virtual servers in the same physical machine is performed in the configuration illustrated in FIG. 7. FIGS. 4B and 5B illustrate content of a table when switching to the communication between the virtual servers on the different physical machines is performed.

In FIG. 4A, the alias of the actual buffer 215 (GPA1) of the virtual server 102 (the LPAR#1) corresponds to the virtual buffer 216 (GPA2) of the virtual server 102 (the LPAR#2), but in FIG. 4B, the alias of the actual buffer 215 (GPA1) of the virtual server 102 (the LPAR#1) corresponds to the virtual buffer 216 (GPA3) used by the virtual server 102 (the LPAR#0) (the hypervisor). Since the guest memory address 407 used by the virtual buffer 216 is changed, content of the descriptor address translation performed by the buffer control unit 200 is changed with the change. In the virtual server 102 (the LPAR#3) at the data reception side, the alias of the actual buffer 215 (GPA4) of the connection control unit 201 of the virtual server 102 (the LPAR#0) is associated with the virtual buffer 216 (GPA5).

In FIG. 5A, the virtual server 102 (the LPAR#1) performs communication with the virtual server 102 (the LPAR#2) through the VNIC 219 (#1) (corresponding to the queue pair S_IF 702), but in FIG. 4B, the virtual server 102 (the LPAR#1) performs communication with the virtual server 102 (the LPAR#3) through the physical NIC 110-3 (VF#1).

Figure 9:
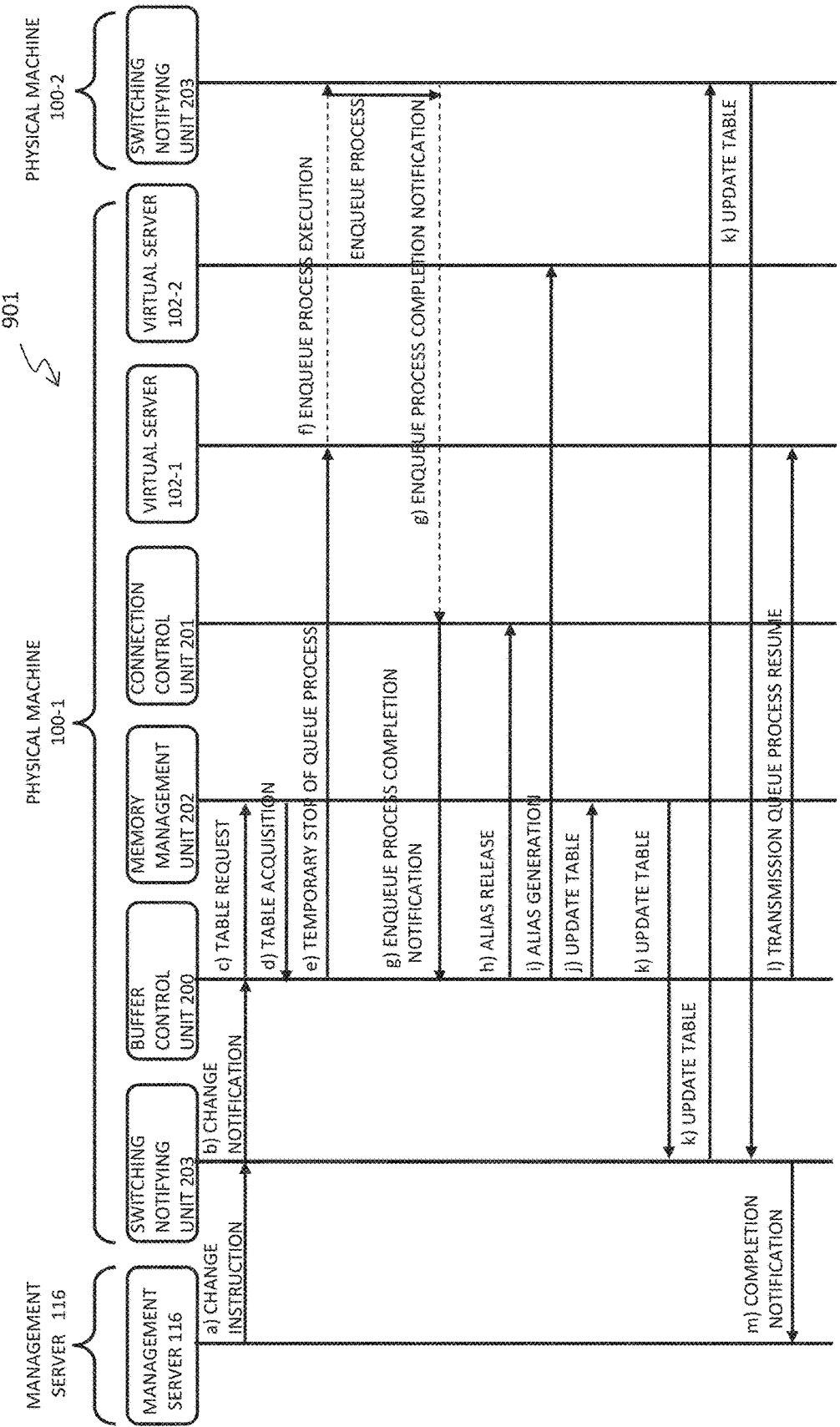
FIG. 9 is an exemplary timing chart in which communication between different physical machines is switched to communication within the same physical machine according to the first embodiment.

FIG. 9 illustrates an example of a timing chart when switching from the communication between the virtual servers on the different physical machines to the communication between the virtual servers in the same physical machine is performed.

First, the path change instruction is transmitted from the management server 116 to the physical machine 100-1 serving as the communication path switching target (a). The path change instruction is received by the switching notifying unit 203, and the change notification is transmitted to the buffer control unit 200 (b). The buffer control unit 200 requests the table information (the operation position information table 205 and the inter-LPAR communication path table 204) held in the memory management unit 202 (c), acquires the table information (d), and temporarily stops the transmission process of the virtual server 102-1 serving as the communication path change target (e). At this time, when there is data that is not transmitted, the data is transmitted to the physical machine 100 serving as the communication destination. In other words, an enqueue process of writing the data to the virtual server 102-3 of the physical machine 100-2 starts (f), and when the physical machine 100-2 completes the enqueue process, an enqueue process completion notification is transmitted from the physical machine 100-2 to the buffer control unit 200 through the connection control unit 201 (g). At this time, since the process of the virtual server 102-1 is not stopped, the processing result is stored in the actual buffer 215.

After all the non-transmitted data is transmitted, the buffer control unit 200 releases the virtual buffer 216 (the alias of the actual buffer 215 of the virtual server 102-1) allocated to the connection control unit 201 (h), and newly allocates the virtual buffer 216 (the alias of the actual buffer 215 of the virtual server 102-1) to the virtual server 102-2 serving as the communication destination (i). After the virtual buffer 216 is allocated, the buffer control unit 200 updates the respective tables, and transmits the updated tables to the memory management unit 202 (j). The memory management unit 202 transmits the acquired updated tables the relevant physical machines 100 through the switching notifying unit 203 (k). Thereafter, the process of the transmission queue of the virtual server 102-1 resumes (l), and the communication path change completion notification is transmitted to the management server 116 (m).

Next, an example of a process performed by the hypervisor 101 will be described with reference to a flowchart. Here, since the physical machine 100-2 serving as the transmission destination can have an arbitrary configuration, a process performed by the hypervisor 101 of the physical machine 100-1 serving as the transmission source will be described.

Figure 10:
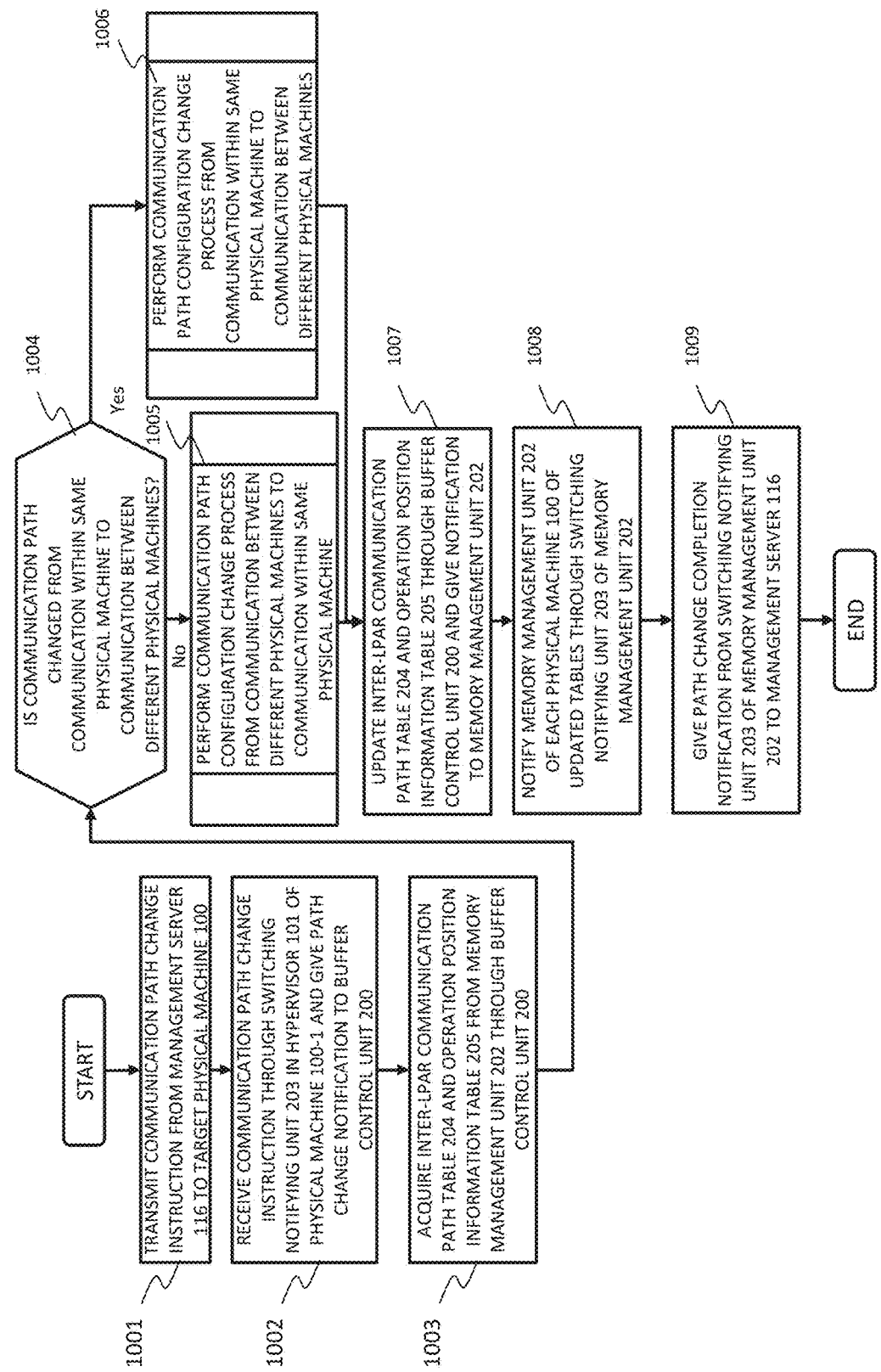
FIG. 10 is an exemplary flowchart for describing an overall process when a communication path is switched according to the first embodiment.

FIG. 10 is an example of a flowchart illustrating an overview of a process performed by the hypervisor 101. First, the management server 116 transmits the communication path change instruction to the physical machine 100 serving as the communication path change target (1001). The communication path change instruction is received by the switching notifying unit 203 in the hypervisor 101, and the communication path change notification is given to the buffer control unit 200 (1002). The buffer control unit 200 that has received the change notification acquires the inter-LPAR communication path table 204 and the operation position information table 205 held in the memory management unit 202 (1003). The information of the physical machine 100 operated by the virtual server 102 and the information of the buffer that is currently used are registered in the operation position information table 205, and it is determined whether the communication path is switched to the communication between the virtual servers in the same physical machine or the communication between the virtual servers on the different physical machines based on the information (1004).

A process of switching the communication path to the communication between the virtual servers in the same physical machine (1005) and a process of switching the communication path to the communication between the virtual servers on the different physical machines (1006) will be described later.

After the communication path between the virtual servers 102 is switched, the buffer control unit 200 updates the inter-LPAR communication path table 204 and the operation position information table 205 and notifies the memory management unit 202 of the updated tables (1007). The memory management unit 202 transmits the updated inter-LPAR communication path table 204 and the operation position information table 205 to the respective physical machines 100 through the switching notifying unit 203 (1008). In the transmission process, the tables may be transmitted to the respective physical machines 100, or only updated parts may be extracted and transmitted. The memory management unit 202 gives the communication path change completion notification to the management server 116 through the switching notifying unit 203 (1009).

Figure 11:
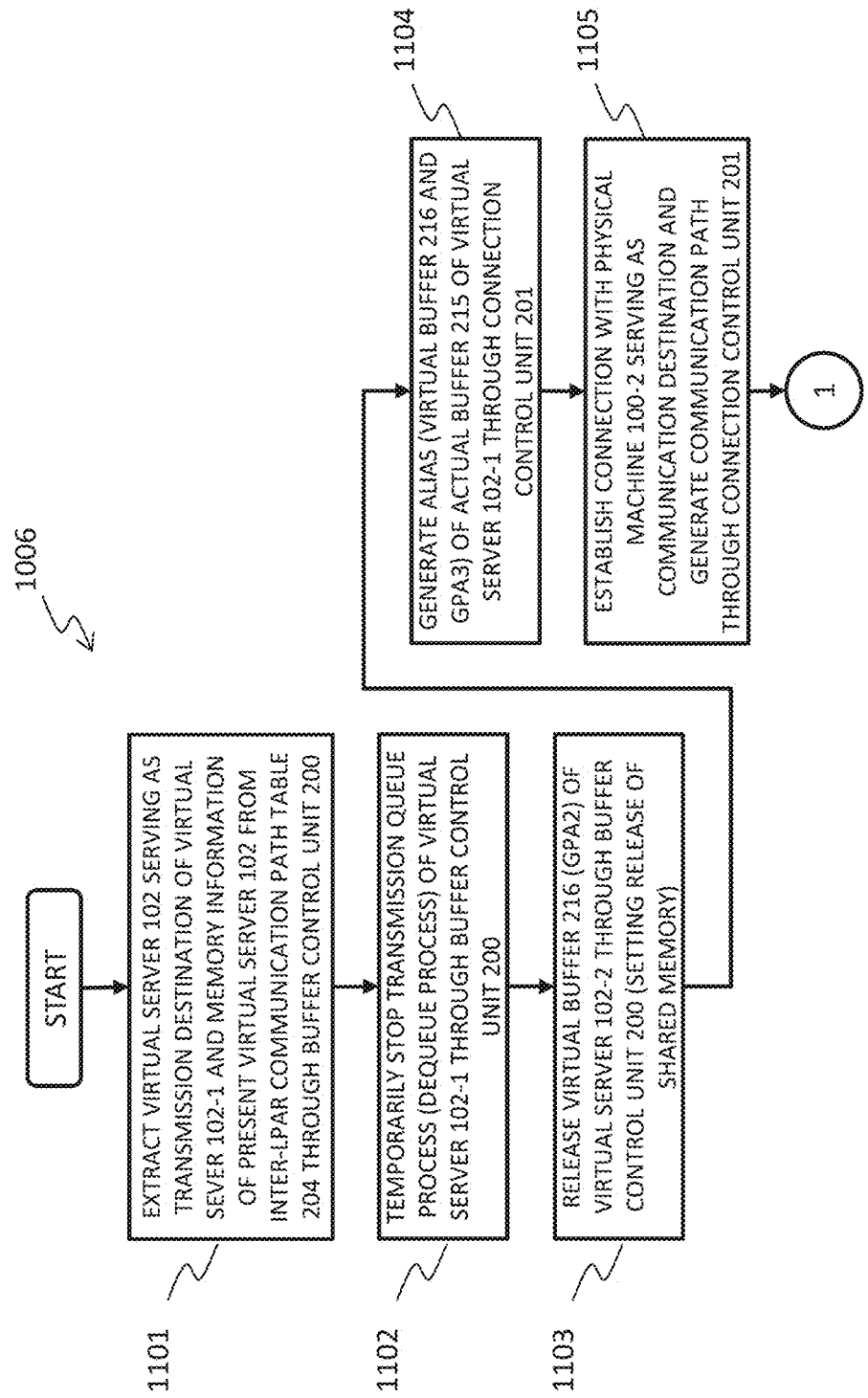
FIG. 11 is an exemplary flowchart of a communication path change process of changing a communication path from communication within the same physical machine to communication between different physical machines according to the first embodiment.

FIG. 11 is an example of a flowchart illustrating the process (1006) of switching the communication path to the communication between the virtual servers on the different physical machines.

First, the buffer control unit 200 extracts the communication destination of the virtual server 102-1 (the virtual server 102-2) and the memory information of the communication destination from the inter-LPAR communication path table 204 (1101), and temporarily stops a transmission queue process (a dequeue process) of the virtual server 102-1 serving as the communication source (1102).

Then, the buffer control unit 200 releases the virtual buffer 216 (GPA2) of the virtual server 102-2 (1103), and the connection control unit 201 generates the virtual buffer 216 (GPA3) as the alias of the actual buffer 215 of the virtual server 102-1 (1104). Through the present process, switching from the communication in which the communication path between the virtual servers 102 uses the shared memory to the communication directed toward the outside is performed.

Lastly, the connection control unit 201 establishes a connection with the physical machine 100-2 serving as the communication destination, and generates the communication path (1105). Here, the connection is established through the switching of the communication path, but the connection may be established in advance.

Figure 12:
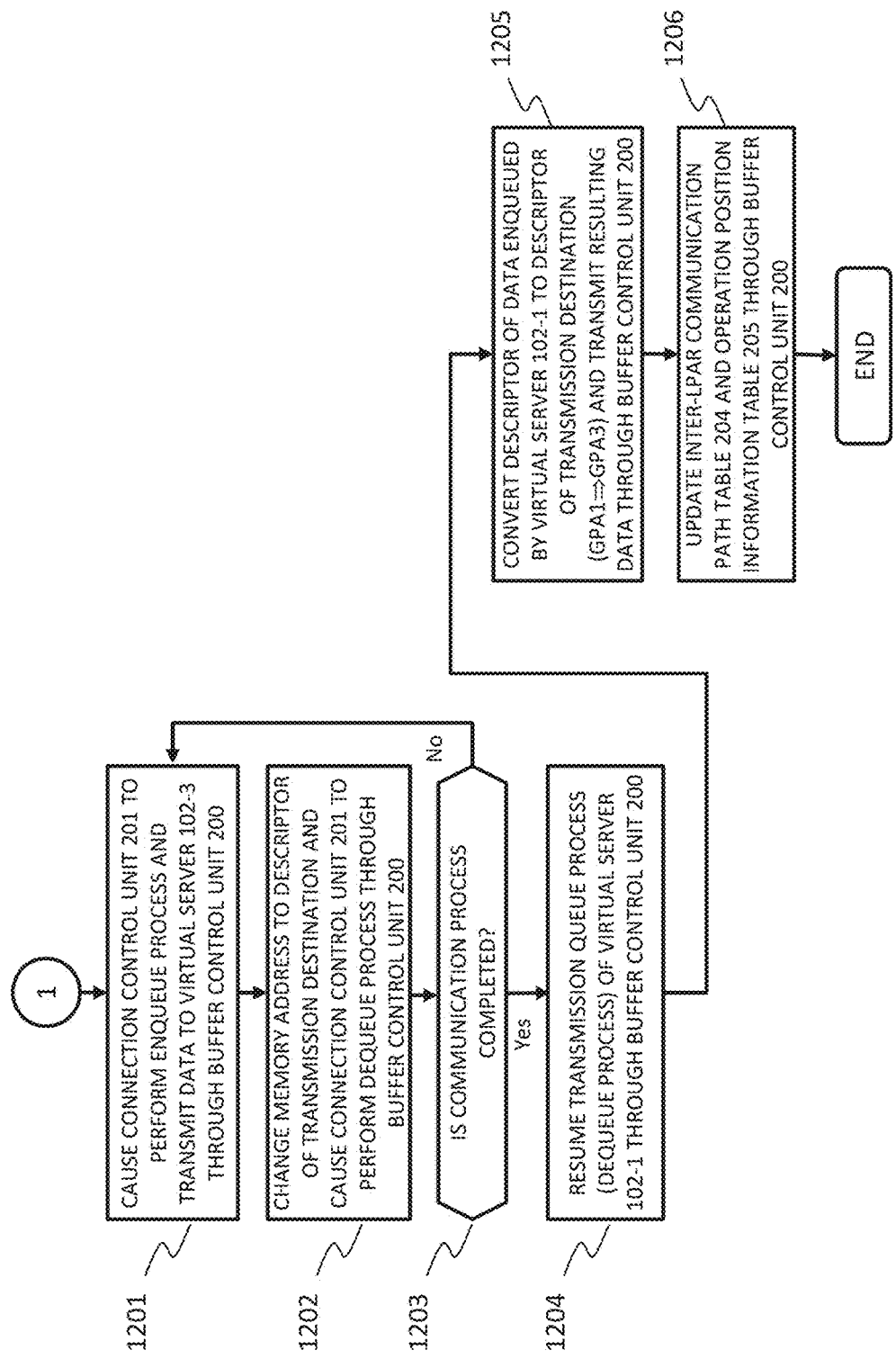
FIG. 12 is an exemplary flowchart after a communication path change process of changing a communication path from communication within the same physical machine to communication between different physical machines according to the first embodiment.

FIG. 12 is an example of a flowchart illustrating a communication process after the communication path is switched to the communication between the virtual servers on the different physical machines.

After the communication path is switched to the communication between the virtual servers on the different physical machines, the buffer control unit 200 performs the process (the enqueue process) of transmitting non-transmitted data to the virtual server 102-3 of the physical machine 100-2 through the connection control unit 201 (1201). At this time, the buffer control unit 200 changes the memory address so that the memory address information (descriptor) scheduled to be transmitted to the virtual server 102-2 is transmitted to the virtual buffer 216 (GPA3) allocated to the connection control unit 201, and performs the process (the dequeue process) of registering the data in the virtual buffer 216 (GPA) (1202).

After the transmission of the non-transmitted data is completed (1203), the buffer control unit 200 resumes the process of the transmission queue of the virtual server 102-1 (1204). Thereafter, the buffer control unit 20 converts the descriptor of the data enqueued by the virtual server 102-1 to the virtual buffer 216 (GPA3) of the connection control unit 201 serving as the transmission destination, and transmits the resulting data (1205).

After the communication process of the virtual server 102-1 resumes, the buffer control unit 200 updates the inter-LPAR communication path table 204 and the operation position information table 205 (1206).

Figure 13:
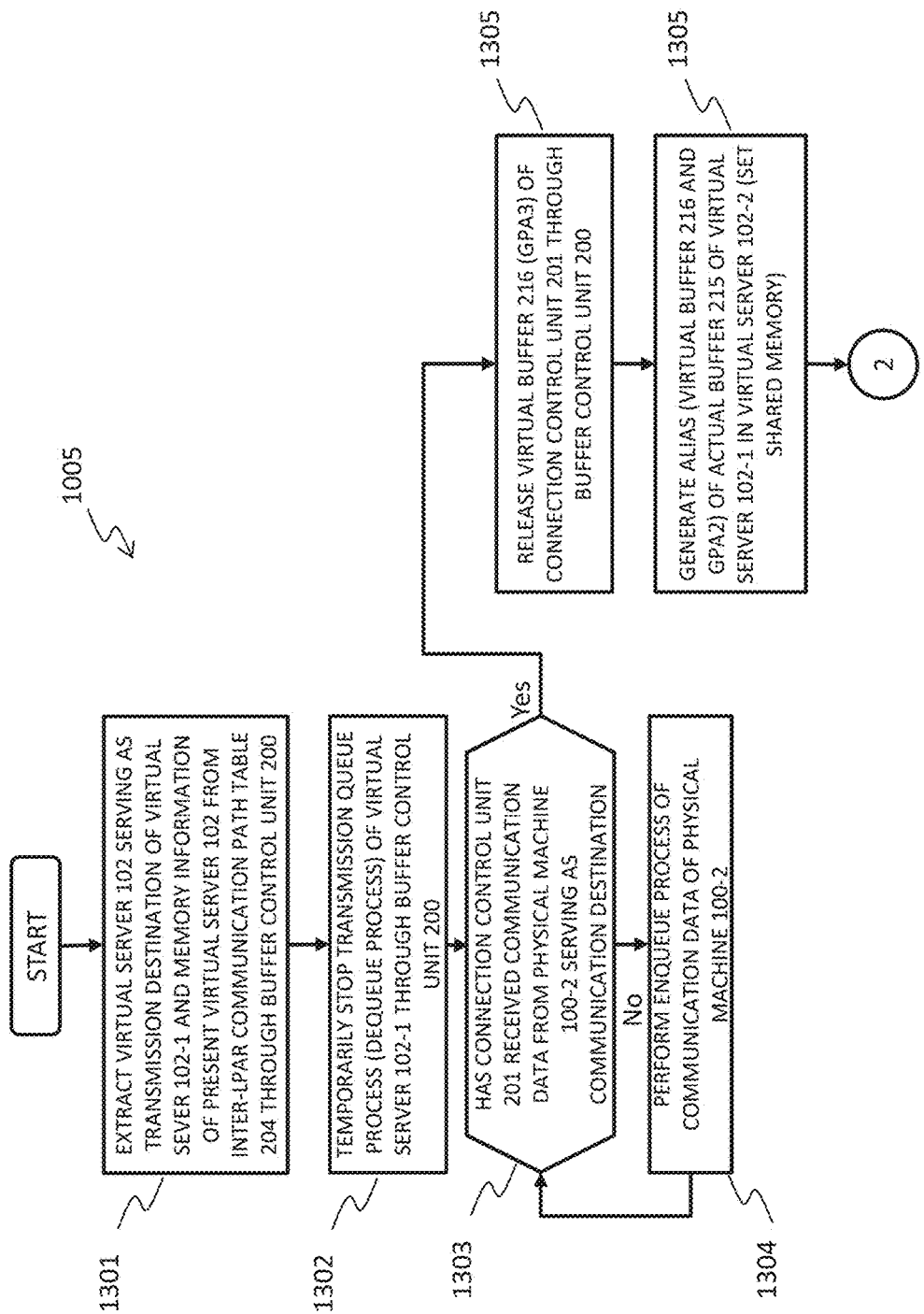
FIG. 13 is an exemplary flowchart of a communication path change process of changing a communication path from communication between different physical machines to communication within the same physical machine according to the first embodiment.

FIG. 13 is an example of a flowchart illustrating the process (1005) of switching the communication path to the communication between the virtual servers in the same physical machine.

First, the buffer control unit 200 extracts the communication destination of the virtual server 102-1 (the virtual server 102-2) and the memory information of the communication destination from the inter-LPAR communication path table 204 (1301), and temporarily stops the transmission queue process (the dequeue process) of the virtual server 102-1 serving as the communication source (1302).

Then, the connection control unit 201 monitors whether or not the communication data has been received from the physical machine 100-2 serving as the communication destination (1303), and performs the enqueue process of the communication data of the physical machine 100-2 until the reception is completed (1304).

When the reception of the communication data of the physical machine 100-2 is completed, the buffer control unit 200 releases the virtual buffer 216 (GPA3) allocated to the connection control unit 201 (1305), generates the virtual buffer 216 (GAP2) serving as the alias of the actual buffer 215 of the virtual server 102-1 in the virtual server 102-2, and generates the communication path using the shared memory (1306).

Figure 14:
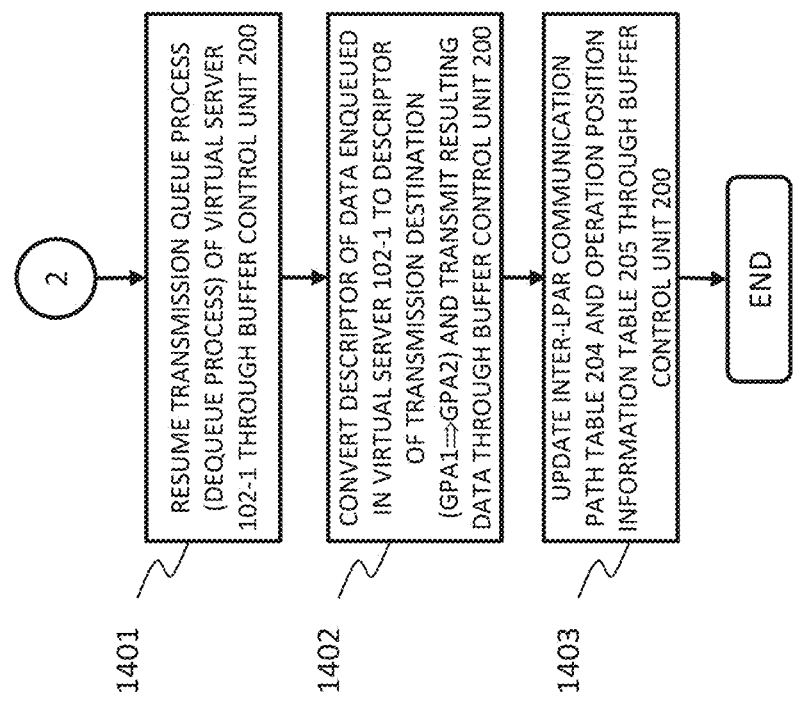
FIG. 14 is an exemplary flowchart after a communication path change process of changing a communication path from communication between different physical machines to communication within the same physical machine according to the first embodiment.

FIG. 14 is an example of a flowchart illustrating a communication process after the communication path is switched to the communication between the virtual servers in the same physical machine.

After the communication path is switched to the communication between the virtual servers in the same physical machine, the buffer control unit 200 resumes the process of the transmission queue of the virtual server 102-1 (1401). Thereafter, the buffer control unit 200 converts the descriptor of the data enqueued by the virtual server 102-1 to the virtual buffer (GPA2) of the virtual server 102-2 serving as the transmission destination, and transmits the resulting data (1402).

After the communication process of the virtual server 102-1 resumes, the buffer control unit 200 updates the inter-LPAR communication path table 204 and the operation position information table 205 (1403).

Through the configuration and the process described above, the communication performance between the virtual servers 102 can be maintained using the shared memory for the communication between the virtual servers 102. The communication path between the virtual servers 102 can perform switching by allocating the alias (the virtual buffer 216) of the actual buffer 215 to the communication destination and controlling the memory space used by the virtual buffer 216. As a result, since it is unnecessary to prepare a plurality of ports that are allocated to the virtual server 102 for each path, it is possible to easily perform the configuration management of the virtual server 102, and it is possible to easily switch the communication path by allocating the virtual buffer 216.

Second Embodiment

The present embodiment will be described with an example of the physical machine 100 when RDMA 1502 for transmitting data directly to the memory 103 is used for the communication path used for the communication between the virtual servers on the different physical machines.

Figure 15:
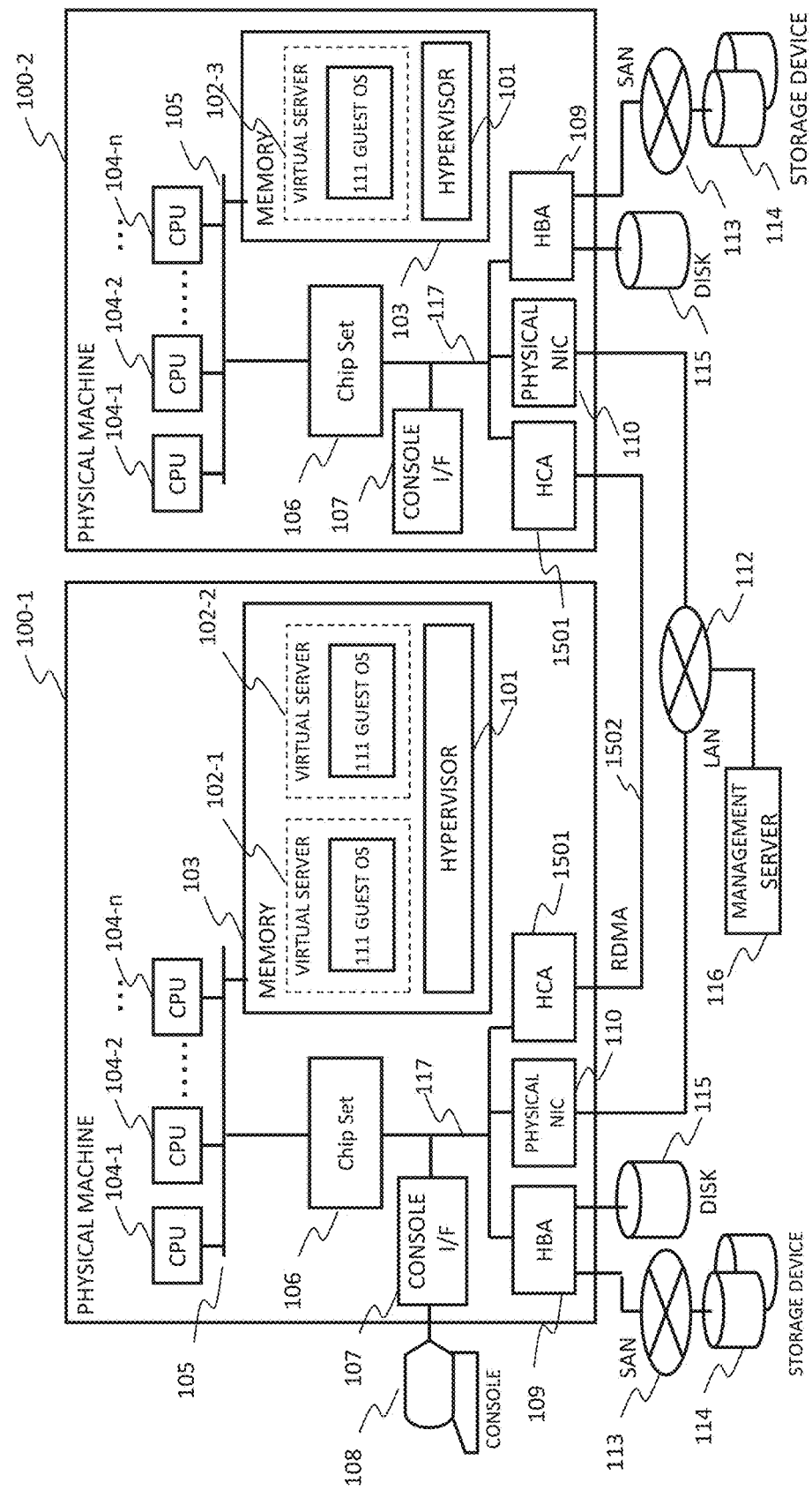
FIG. 15 is an exemplary configuration diagram of a physical machine according to a second embodiment.

FIG. 15 is an exemplary configuration diagram illustrating a physical machine 100 on which a plurality of virtual servers 102 operates according to a second embodiment. In the physical machine 100 of FIG. 1, a description of parts denoted by the same reference numerals as those in FIG. 1 and parts having the same functions will be omitted.

A physical NIC 110 that is connected to an LAN 112, a HBA 109 connected to a disk 115 or a storage device 114, a console I/F 107 connected to a console 108, and a Host Channel Adapter (HCA) 1501 that performs communication using the RDMA 1502 are connected to a chip set 106 of a physical machine 100 via a bus 117 such as PCI Express.

Figure 16:
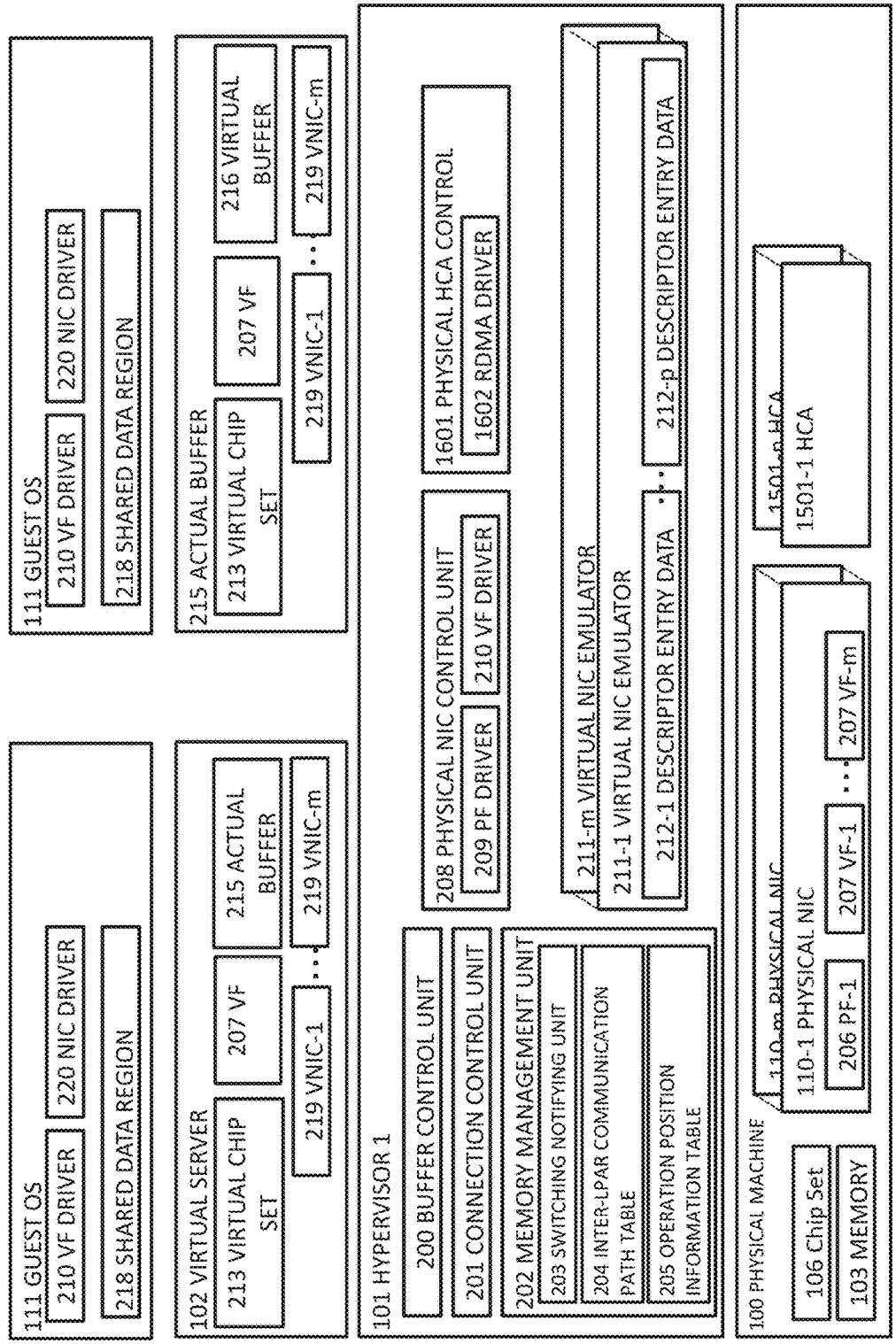
FIG. 16 is an exemplary stack diagram illustrating an exemplary relation between a physical machine and software according to the second embodiment.

Next, a main part of a software configuration for implementing the virtual server 102 on the physical machine 100 and hardware elements serving as a control target will be described with reference to FIG. 16. A description of parts having the same reference numerals as those in FIG. 2 in the first embodiment is described.

One or more HCAs 1501 have an RDMA function and can access the memory 103 directly when the HCA 1501 having the RDMA function is mounted, similarly to the physical machine 100 serving as the communication destination.

The hypervisor 101 includes a physical HCA control unit 1601 that controls an RDMA driver 1602 that performs communication using the RDMA 1502 through the HCA 1501.

Figure 17:
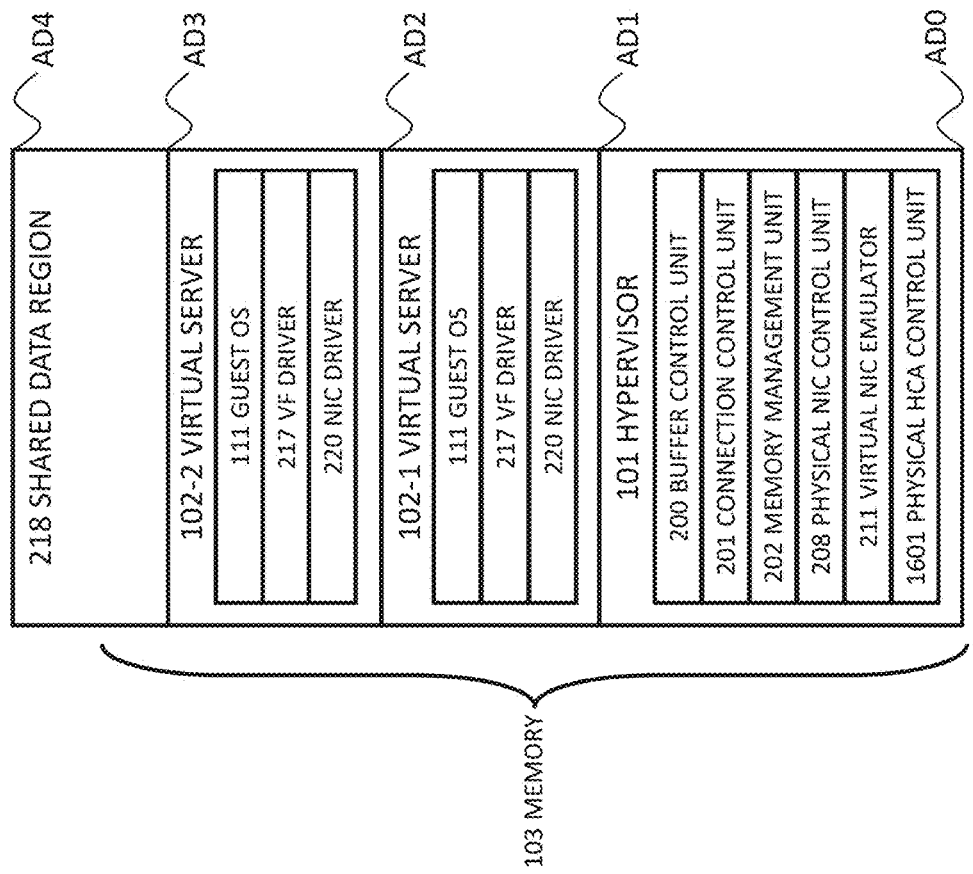
FIG. 17 is a conceptual diagram illustrating exemplary memory content according to the second embodiment.

FIG. 17 illustrates an example of a memory 103 that is managed by the hypervisor 101. A description of parts having the same reference numerals as those in FIG. 3 in the first embodiment is omitted.

The buffer control unit 200, the connection control unit 201, the memory management unit 202, the physical NIC control unit 208, the virtual NIC emulator 211, and the physical HCA control unit 1601 are stored in the region used by the hypervisor 101.

An overview of a process performed by the hypervisor 101 has the sequence described with reference to FIG. 10 in the first embodiment. In the present embodiment, the speed of the communication between the virtual servers on the different physical machines can be increasing by performing the processes (k) to (p) described above with reference to FIG. 7 through the physical machine 100-2 serving as the transmission destination.

Next, a process of the hypervisor 101 of the physical machine 100-2 serving as the transmission destination in the process (1005) of switching the communication path to the communication between the virtual servers in the same physical machine will be described.

The process (1006) of switching the communication path to the communication between the virtual servers on the different physical machines is a process of disconnecting the communication with the physical machine 100-2 serving as the transmission destination, and a description thereof is omitted.

Figure 18:
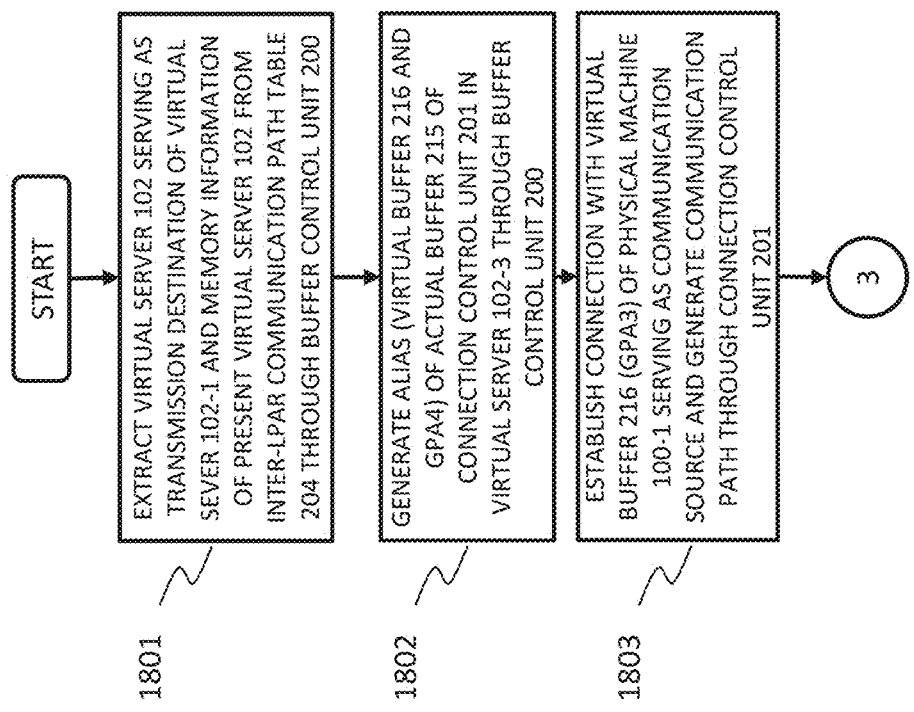
FIG. 18 is an exemplary flowchart of a communication path change process of changing a communication path from communication within the same physical machine to communication between different physical machines according to the second embodiment.

FIG. 18 is an example of a flowchart illustrating the process (1006) of switching the communication path to the communication between the virtual servers on the different physical machines.

First, the buffer control unit 200 extracts the communication destination of the virtual server 102-1 (the virtual server 102-2) and information of the memory 103 of the communication destination from the inter-LPAR communication path table 204 (1801).

Then, the buffer control unit 200 generates the virtual buffer 216 (GPA4) serving as the alias of the actual buffer 215 of the connection control unit 201 in the virtual server 102-3 (1802).

Lastly, the connection control unit 201 establishes the connection with the virtual buffer 216 (GPA3) allocated to the connection control unit 201 of the physical machine 100-1 serving as the communication source, and generates the communication path (1803).

Figure 19:
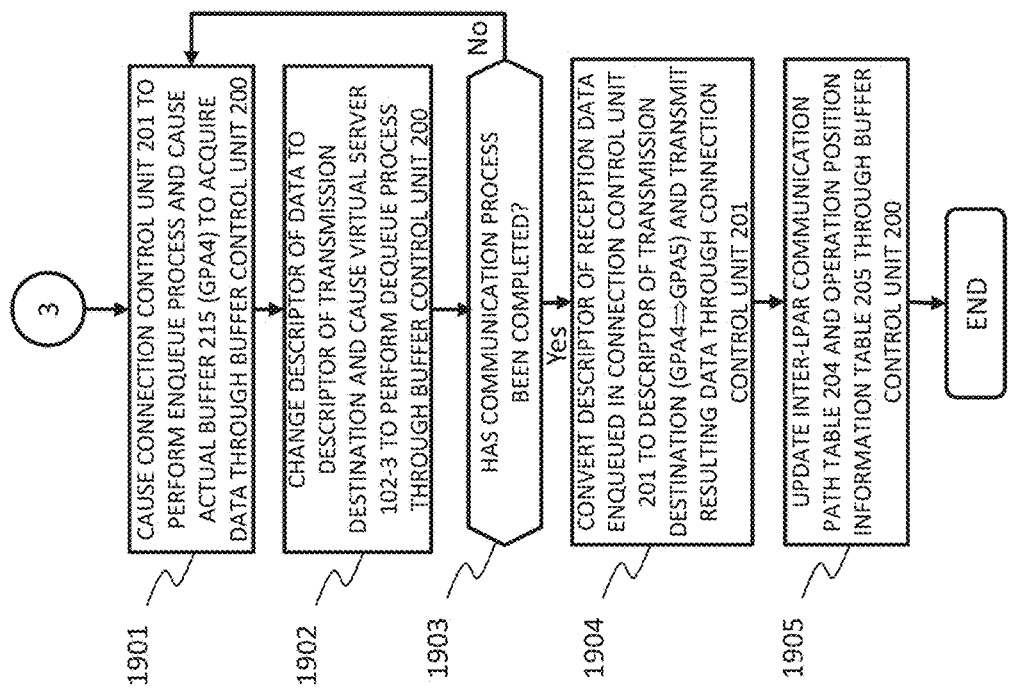
FIG. 19 is an exemplary flowchart after a communication path change process of changing a communication path from communication within the same physical machine to communication between different physical machines according to the second embodiment.

FIG. 19 is an example of a flowchart illustrating a communication process after the communication path is switched to the communication between the virtual servers on the different physical machines.

First, the buffer control unit 200 causes the connection control unit 201 to perform the enqueue process and causes the actual buffer 215 (GPA4) to acquire data (1901), and the buffer control unit 200 changes the descriptor of the acquired data to the descriptor of the virtual server 102-3 serving as the transmission destination and performs the dequeue process of the virtual server 102-3 (1902).

Then, when the communication process is completed (1903), the buffer control unit 200 converts the descriptor of the received data enqueued by the connection control unit 201 to the descriptor of the virtual buffer 216 (GPA5) allocated to the virtual server 102-3 of the transmission destination, and transmits the resulting data (1904).

After the data is transmitted to the virtual server 102-3, the buffer control unit 200 updates the inter-LPAR communication path table 204 and the operation position information table 205 (1905).

Through the configuration and the process described above, the shared memory can be used for the communication between the virtual servers 102, and when the communication path is switched to the communication between the virtual servers on the different physical machines, the RDMA 1502 can be used. Thus, the communication performance between the virtual servers 102 can be maintained regardless whether the communication is performed between the different physical machines 100 or within the same physical machine 100. The communication path between the virtual servers 102 can be switched by allocating the alias (the virtual buffer 216) of the actual buffer 215 to the communication destination and controlling the memory space used by the virtual buffer 216. As a result, since it is unnecessary to prepare a plurality of ports that are allocated to the virtual server 102 for each path, it is possible to easily perform the configuration management of the virtual server 102, and it is possible to easily switch the communication path by allocating the virtual buffer 216.

The above embodiments have been described in connection with the process of switching the communication path between the virtual servers 102, but the same effects can be obtained even at the time of migration of the virtual server 102. For example, in the physical machine 100 serving as the migration destination of the virtual server 102, resources such as the memory 103 used by the virtual server 102 are allocated through the hypervisor 101. When the operation position information table 205 and the inter-LPAR communication path table 204 are updated based on the allocated information, switching from the use of the shared memory to the use of the RDMA 1502 can be performed even after the migration.

In the embodiments, the management server 116 gives the instruction to change the communication path between the virtual servers 102 to the target physical machine 100. An example of giving the change instruction through the management server 116 will be described with reference to FIG.

20. However, the instruction to change the communication path between the virtual servers 102 is not limited to the notification given from the management server 116, and, for example, the communication path between the virtual servers 102 may be automatically switched according to use situations of resources through a performance monitor of the hypervisor 101.

Figure 20:
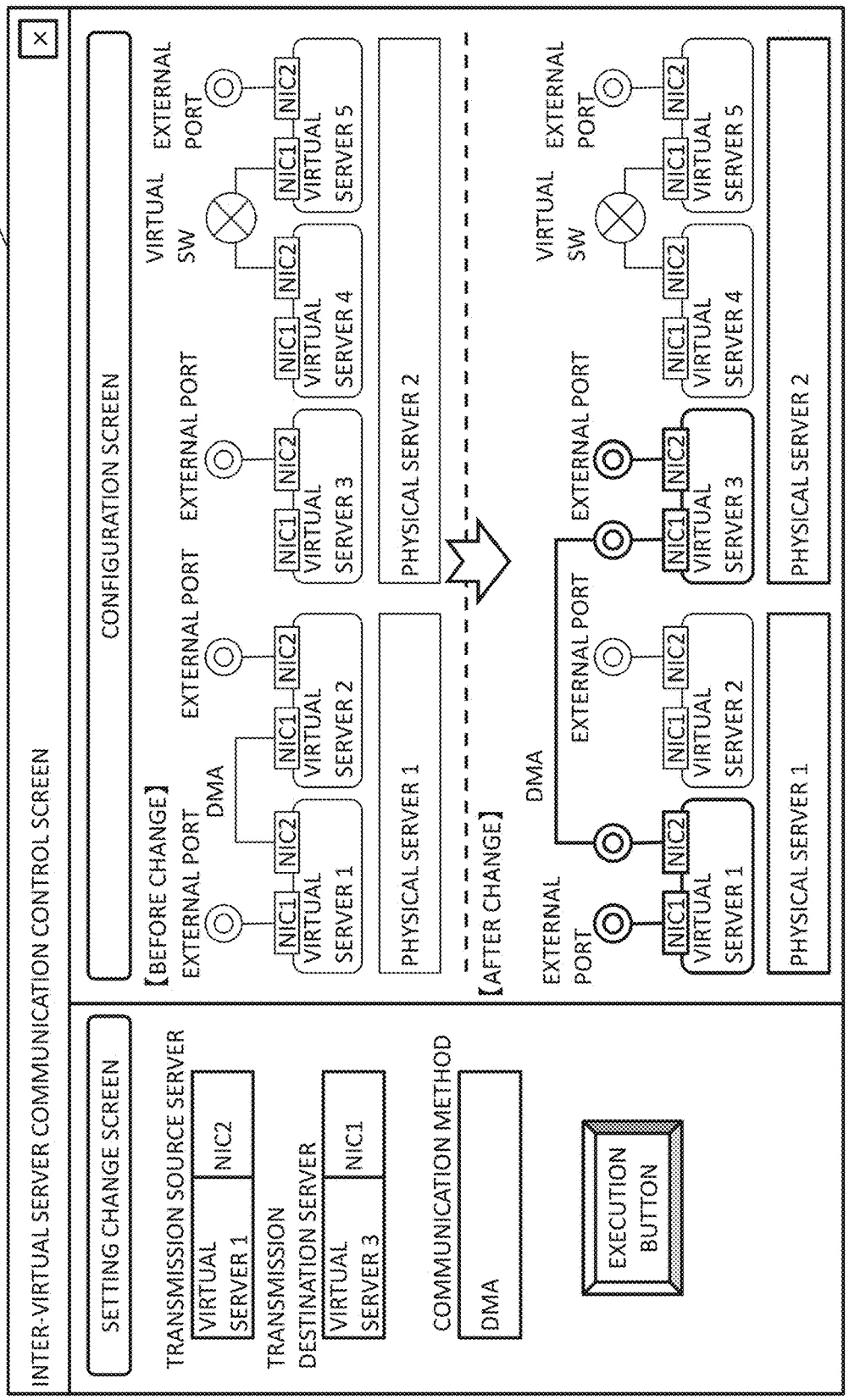
FIG. 20 is a plane view illustrating an exemplary management screen of a management server according to the first and second embodiments.

FIG. 20 is an example illustrating a management screen 2001 of the management server 116. FIG. 20 illustrates a screen for controlling the communication between the virtual servers 102, and the screen includes a setting change screen used for selecting the virtual server 102 serving as a target and a configuration screen indicating a configuration of the communication path. In the present embodiment, the communication path change instruction can be given through an instruction from the management server.

In the setting change screen, the virtual servers 102 serving as the transmission source and the transmission destination and a communication means between the virtual servers 102 are selected. Specifically, the virtual server 102 serving as the communication path switching target and a communication port used by the virtual server 102 are selected, and a communication means used for the communication path between the virtual servers 102 is selected. Normal network communication is assumed to be used as the communication method, and, for example, "DMA" is input when the high-speed communication using the shared memory is performed.

In the configuration screen, respective network configurations are illustrated so that configurations before and after the communication path is switched can be understood.

A management screen 2001 is not limited to the present screen configuration, and, for example, the above-described input content may be included in a construction screen of the virtual server 102. The screen may be switched as necessary without displaying the configuration screens before and after the change.

According to the above embodiments, the communication performance between the virtual servers 102 can be maintained using the shared memory for the communication between the virtual servers 102. The communication path between the virtual servers 102 is implemented by the memory address control of the actual buffer 215 and the virtual buffer 216 allocated to the transmission source and the transmission destination. Thus, it is unnecessary to prepare a plurality of communication ports that are allocated to the virtual server 102 for each path, it is possible to easily perform the configuration management of the virtual server 102, and it is possible to easily switch the communication path by the memory address control of the actual buffer 215 and the virtual buffer 216.

The exemplary embodiments of the present invention have been described above, but the technical scope of the present invention is not limited to the scope described in the above embodiments. The invention made by the inventor(s) has been specifically described above based on the above embodiments, but it will be appreciated that various changes or improvements can be made within the scope not departing from the gist of the invention. Thus, it will be appreciated that embodiments in which such changes or improvements are made are included in the technical scope of the present invention.

The invention claimed is:
1. A computer system, comprising:
one or more virtual machines operating on one or more physical machines each of which includes one or more CPUs, one or more memories, and one or more I/O devices;
wherein the physical machine has a hypervisor that controls the virtual machine;
wherein the hypervisor includes (1) a buffer control unit that controls an actual buffer and a virtual buffer allocated to the virtual machine and the I/O device, (2) a connection control unit that controls a communication process on the I/O device mounted in the physical machine, and (3) a memory management unit that holds an inter-LPAR communication table in which the communication path between the virtual machines is recorded, and communication port information is included and an operation position information table in which position information of the virtual machine is recorded, and memory address information is included;
wherein (A) when communication between a transmission side virtual machine and a reception side virtual machine is switched to communication between the transmission side virtual machine and another virtual machine, (A1) the buffer control unit switches an allocation of the virtual buffer serving as an alias of the actual buffer allocated to a communication port used by the transmission side virtual machine from a communication port with which the reception side virtual machine is able to perform communication to a communication port with which the other virtual machine is able to perform communication, and (A2) the buffer control unit performs memory address translation on a region of the memory referred to by the virtual buffer, and establishes a communication path between the transmission side virtual machine and the other virtual machine by associating a region of the memory referred to by the transmission side virtual machine and a region of the memory referred to by the other virtual machine, based on the memory address translation on the region of the memory referred to by the virtual buffer serving as the alias of the actual buffer allocated to the communication port used by the transmission side virtual machine;
wherein (B) when the communication path is changed to a communication path in which communication is performed between the transmission side virtual machine operating in a first physical machine and the other virtual machine operating in the first physical machine by a communication path change instruction of a management server, (B1) the buffer control unit acquires memory address information of the transmission side virtual machine and the other virtual machine from the operation position information table of the memory management unit and acquires communication port information of the transmission side virtual machine and the other virtual machine from the inter-LPAR communication table, (B2) the buffer control unit performs an allocation of the virtual buffer to a communication port of the other virtual machines and address changes based on a descriptor, and (B3) the buffer control unit uses a shared memory for the communication path between the transmission side virtual machine and the other virtual machine; and
wherein (C) when the communication path is changed to a communication path in which communication is performed between the transmission side virtual machine operating in a first physical machine and the other virtual machine operating in a second physical machine other than the first physical machine by a communication path change instruction of a management server, (C1) the buffer control unit acquires memory address information of the transmission side virtual machine and the connection control unit from the operation position information table of the memory management unit and acquires communication port information of the transmission side virtual machine and the connection control unit from the inter-LPAR communication table, (C2) the buffer control unit performs an allocation of the virtual buffer to a communication port of the connection control unit and address changes based on a descriptor, and (C3) the buffer control unit generates a communication path in which a region of the memory used by the transmission side virtual machine is communicated to the other virtual machine of the second physical machine through the connection control unit.

2. The computer system according to claim 1, wherein the buffer control unit acquires operation position of the virtual machine serving as a target of the communication path change instruction of the management server from the operation position information table, and wherein the buffer control unit determines whether or not the communication path is changed to communication between the virtual machines operating in the same physical machine or communication between the virtual machines operating in different physical machines.

3. The computer system according to claim 1, wherein, when the communication path between the virtual machines is changed by the communication path change instruction of the management server, the inter-LPAR communication table and the operation position information table updated by the buffer control unit are transferred to the memory management unit, a switching notifying unit of the memory management unit transmits the inter-LPAR communication table and the operation position information table to the memory management units of the physical machines, and the inter-LPAR communication table and the operation position information table received by the memory management units in the physical machines are reflected in the inter-LPAR communication table and the operation position information table held therein, so that the inter-LPAR communication table and the operation position information table are shared among the physical machines.

4. The computer system according to claim 1, wherein, when the communication path change instruction of the management server is an instruction to change to a communication path in which communication is performed between the transmission side virtual machine operating in a first physical machine and the other virtual machine operating in a second physical machine other than the first physical machine, and communication between the first physical machine and the second physical machine is performed using RDMA (Remote Direct Memory Access), the buffer control unit acquires memory address information of the transmission side virtual machine and the connection control unit from the operation position information table of the memory management unit and acquires communication port information of the transmission side virtual machine and the connection control unit from the inter-LPAR communication table, the buffer control unit performs an allocation of the virtual buffer to a communication port of the connection control unit and address change, and the connection control unit acquires a region of the memory used by the transmission side virtual machine, and transmits data to which a memory address of the second physical machine serving as a transmission destination is attached.

* * * * *